US012580799B2

(12) United States Patent
El Hamss et al.

(10) Patent No.: US 12,580,799 B2
(45) Date of Patent: Mar. 17, 2026

(54) METHODS, APPARATUSES DIRECTED TO ENABLING TONE RESERVATIONS IN WIRELESS SYSTEMS

(71) Applicant: InterDigital Patent Holdings, Inc., Wilmington, DE (US)

(72) Inventors: Aata El Hamss, Laval (CA); Paul Marinier, Brossard (CA); Moon Il Lee, Melville, NY (US); Janet Stern-Berkowitz, Little Neck, NY (US); Virgil Comsa, Montreal (CA); Fumihiro Hasegawa, Westmount (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 307 days.

(21) Appl. No.: 18/031,692

(22) PCT Filed: Oct. 13, 2021

(86) PCT No.: PCT/US2021/054801
§ 371 (c)(1),
(2) Date: Apr. 13, 2023

(87) PCT Pub. No.: WO2022/081722
PCT Pub. Date: Apr. 21, 2022

(65) Prior Publication Data
US 2023/0327934 A1      Oct. 12, 2023

Related U.S. Application Data

(60) Provisional application No. 63/228,724, filed on Aug. 3, 2021, provisional application No. 63/091,344, filed on Oct. 14, 2020.

(51) Int. Cl.
*H04W 52/36* (2009.01)
*H04L 5/00* (2006.01)
*H04L 27/26* (2006.01)

(52) U.S. Cl.
CPC ........ *H04L 27/2618* (2013.01); *H04L 5/0094* (2013.01); *H04W 52/365* (2013.01)

(58) Field of Classification Search
None
See application file for complete search history.

(56) References Cited

U.S. PATENT DOCUMENTS

| | | | | |
|---|---|---|---|---|
| 2007/0242598 | A1* | 10/2007 | Kowalski | ............ H04L 27/2618 |
| | | | | 370/206 |
| 2018/0034675 | A1* | 2/2018 | Tosato | ................ H04L 27/2626 |

(Continued)

FOREIGN PATENT DOCUMENTS

| | | |
|---|---|---|
| EP | 1944903 A1 | 7/2008 |
| WO | 2008084022 A2 | 7/2008 |

OTHER PUBLICATIONS

Qualcomm Incorporated, "Potential coverage enhancement techniques for PUSCH", 3GPP Tdoc R1-2006977, 3GPP TSG RAN1 WG1 e-Meeting #102, Aug. 17, 2020, 10 pages.

(Continued)

*Primary Examiner* — Kodzovi Acolatse
(74) *Attorney, Agent, or Firm* — VOLPE KOENIG

(57) ABSTRACT

Methods, apparatuses, systems, etc., directed to performing a change of relay are disclosed herein. In an embodiment, a wireless transmit/receive unit (WTRU) may transmit an information for requesting a peak reduction tone (PRT) configuration for reducing a peak to average power ratio (PAPR). In an embodiment, the WTRU may receive an indication of frequency resources to be used for transmitting a PRT signal based on the PRT configuration. In an embodiment, the WTRU may transmit the PRT signal in the frequency resources in addition to an uplink (UL) transmission, wherein the frequency resources for the PRT signal may be allocated based on a set of frequency resources allocated to the UL transmission.

18 Claims, 8 Drawing Sheets

(56) References Cited

U.S. PATENT DOCUMENTS

| | | | | |
|---|---|---|---|---|
| 2021/0336736 A1* | 10/2021 | Horn | .................. | H04L 27/2613 |
| 2021/0359890 A1* | 11/2021 | Sahraei | .............. | H04L 27/2614 |
| 2021/0377813 A1* | 12/2021 | Landis | ............... | H04W 72/542 |
| 2022/0022236 A1* | 1/2022 | Li | ........................ | H04W 28/26 |

OTHER PUBLICATIONS

Rajbanshi et al., "Subcarrier Power Adjustment Technique for Peak-to-Average Power Ratio Reduction of OFDM Systems", Institute of Electrical and Electronics Engineers (IEEE), Milcom 2006—2006 IEEE Military Communications conference, Washington, DC, USA, Oct. 23, 2006, 6 pages.

Wang et al., "Genetic Algorithm Based Nearly Optimal Peak Reduction Tone Set Selection for Adaptive Amplitude Clipping PAPR Reduction", Institute of Electronics and Electrical Engineers (IEEE), IEEE Transactions on Broadcasting, vol. 58, Issue No. 3, Sep. 2012, 10 pages.

Barsanti et al., "Peak to average power ratio reduction for digital video broadcast T2", Institute of Electronics and Electrical Engineers (IEEE), 2011 Proceedings of IEEE Southeastcon, Mar. 17, 2011, Nashville, TN, United States, 5 pages.

3rd Generation Partnership Project (3GPP), R1-2205046, "Network energy saving techniques", Qualcomm Incorporated, 3GPP TSG RAN WG1 #109-e, e-Meeting, May 9-20, 2022, 19 pages.

Motorola, "Tone Reservation for OFDMA PAPR Reduction", 3GPP TSG RAN1#42bis, R1-051032, San Diego, USA, Oct. 10, 2005, 5 Pages.

* cited by examiner

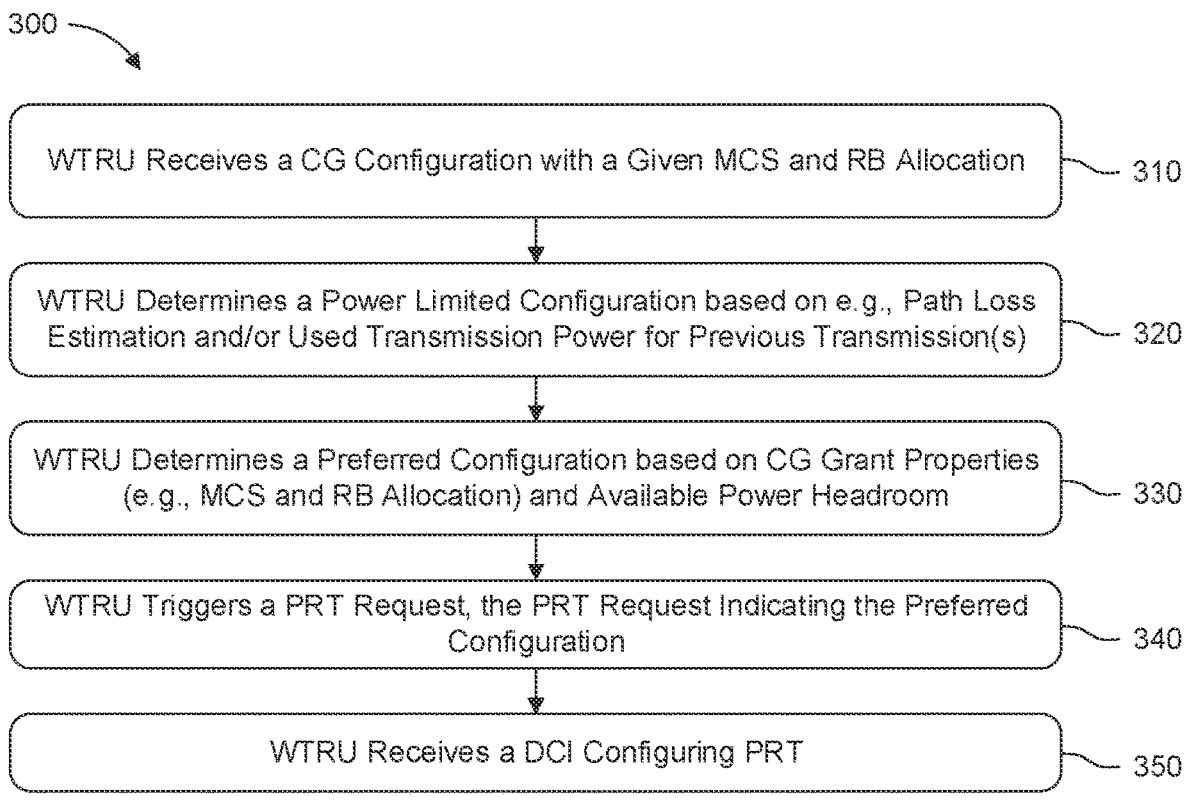

300

WTRU Receives a CG Configuration with a Given MCS and RB Allocation — 310

WTRU Determines a Power Limited Configuration based on e.g., Path Loss Estimation and/or Used Transmission Power for Previous Transmission(s) — 320

WTRU Determines a Preferred Configuration based on CG Grant Properties (e.g., MCS and RB Allocation) and Available Power Headroom — 330

WTRU Triggers a PRT Request, the PRT Request Indicating the Preferred Configuration — 340

WTRU Receives a DCI Configuring PRT — 350

FIG. 3

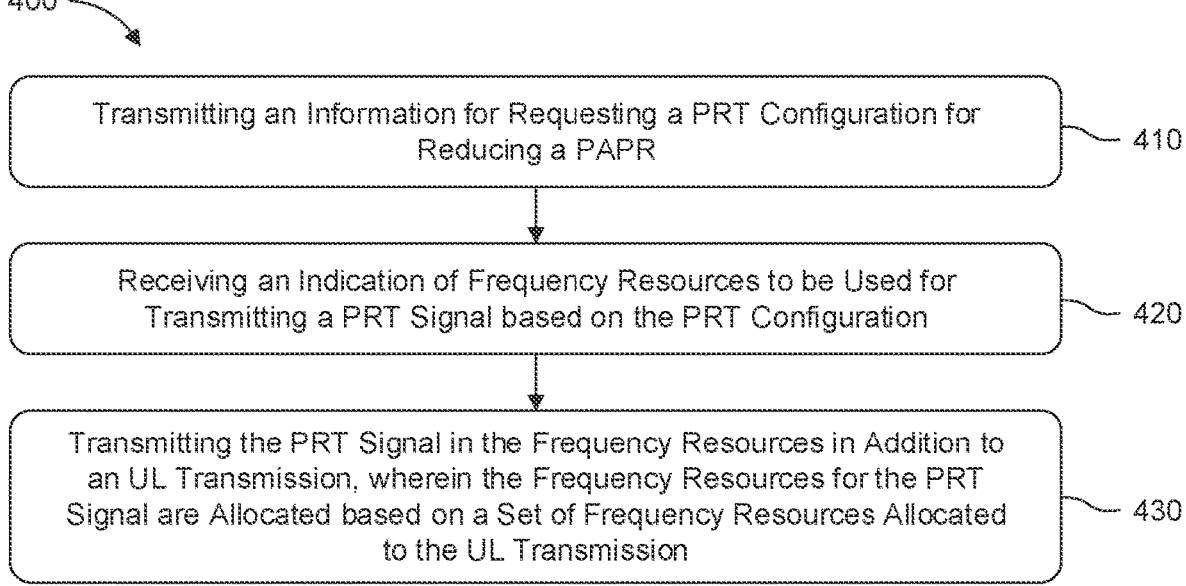

400

Transmitting an Information for Requesting a PRT Configuration for Reducing a PAPR — 410

Receiving an Indication of Frequency Resources to be Used for Transmitting a PRT Signal based on the PRT Configuration — 420

Transmitting the PRT Signal in the Frequency Resources in Addition to an UL Transmission, wherein the Frequency Resources for the PRT Signal are Allocated based on a Set of Frequency Resources Allocated to the UL Transmission — 430

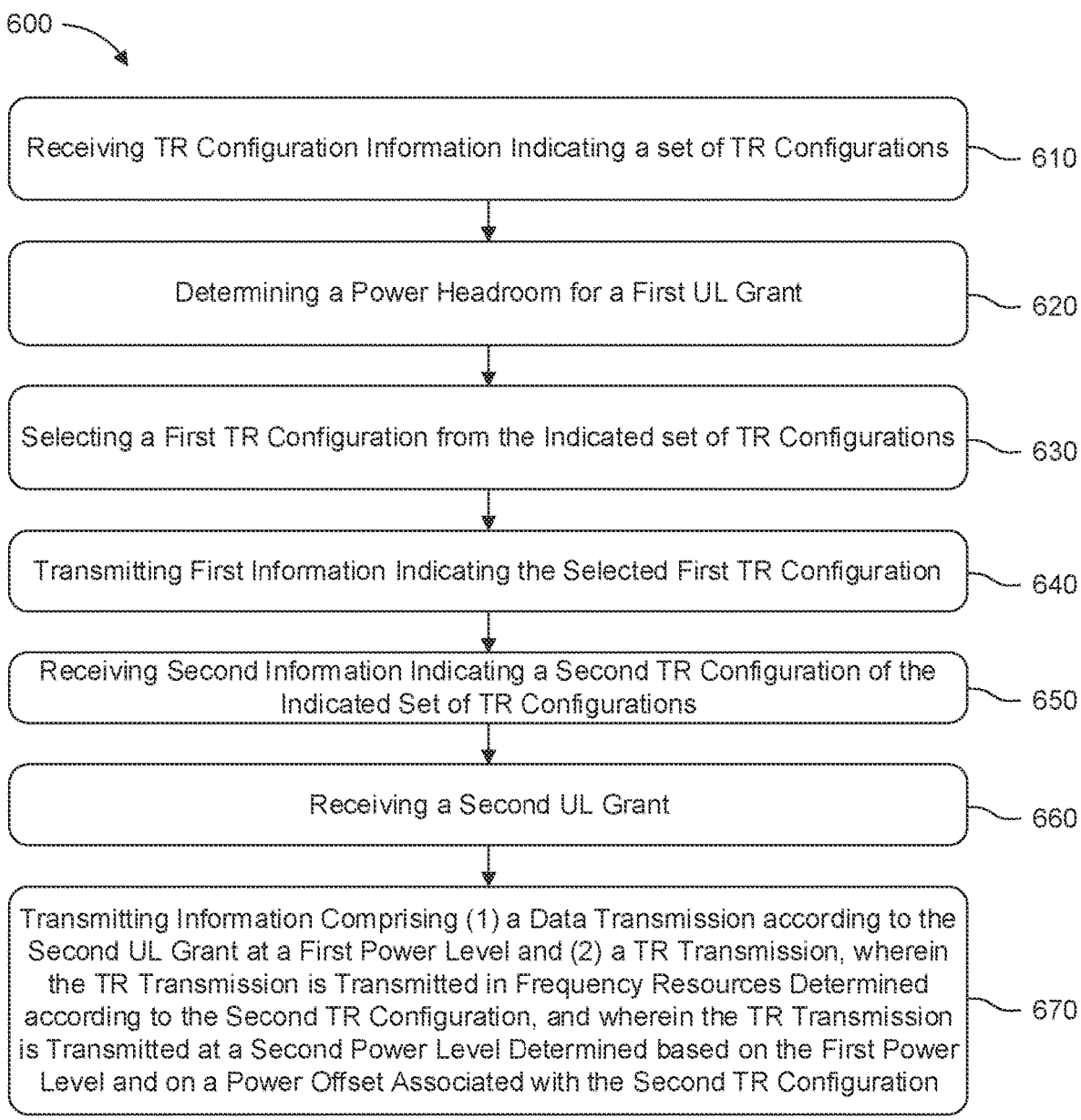

Receiving TR Configuration Information Indicating a set of TR Configurations — 610

Determining a Power Headroom for a First UL Grant — 620

Selecting a First TR Configuration from the Indicated set of TR Configurations — 630

Transmitting First Information Indicating the Selected First TR Configuration — 640

Receiving Second Information Indicating a Second TR Configuration of the Indicated Set of TR Configurations — 650

Receiving a Second UL Grant — 660

Transmitting Information Comprising (1) a Data Transmission according to the Second UL Grant at a First Power Level and (2) a TR Transmission, wherein the TR Transmission is Transmitted in Frequency Resources Determined according to the Second TR Configuration, and wherein the TR Transmission is Transmitted at a Second Power Level Determined based on the First Power Level and on a Power Offset Associated with the Second TR Configuration — 670

FIG. 6

METHODS, APPARATUSES DIRECTED TO ENABLING TONE RESERVATIONS IN WIRELESS SYSTEMS

CROSS-REFERENCE TO RELATED APPLICATIONS

This application is a U.S. National Stage Application under 35 U.S.C. § 371 of International Patent Application No. PCT/US2021/054801 filed Oct. 13, 2021, which claims the benefit of U.S. Provisional Patent Application Nos. (i) 63/091,344 filed Oct. 14, 2020, and (ii) 63/228,724 filed Aug. 3, 2021, each of which is incorporated herein by reference.

BACKGROUND

The present disclosure relates to network communications, including, but not exclusively, to methods, apparatuses, systems, etc. directed to enabling tone reservation (TR) in wireless systems.

SUMMARY

Methods, apparatuses, systems, etc., directed to enabling tone reservation (TR) in wireless systems are disclosed herein. In an embodiment, a wireless transmit/receive unit (WTRU) may transmit an information for requesting a peak reduction tone (PRT) configuration for reducing a peak to average power ratio (PAPR). In the following discussion, the term peak reduction tone (PRT) may be used to refer to any tone reservation (TR) technique that can enable a reduction in the PAPR by reserving a frequency resource or transmission of a signal other than a data signal. In an embodiment, the WTRU may receive an indication of frequency resources to be used for transmitting a PRT signal based on the PRT configuration. In an embodiment, the WTRU may transmit the PRT signal in the frequency resources in addition to an uplink (UL) transmission, wherein the frequency resources for the PRT signal may be allocated based on a set of frequency resources allocated to the UL transmission.

In an embodiment, a WTRU may receive TR configuration information indicating a set of TR configurations. For example, the WTRU may determine a power headroom (PH) for a first uplink grant. For example, the WTRU may select a first TR configuration from the indicated set of TR configurations based on any of the first uplink grant and the determined PH. For example, the WTRU may transmit first information indicating the selected first TR configuration. For example, the WTRU may receive second information indicating a second TR configuration of the indicated set of TR configurations. For example, the WTRU may receive a second uplink grant and may perform a transmission comprising (1) a data transmission according to the second uplink grant at a first power level and (2) a TR transmission, wherein the TR transmission may be transmitted in frequency resources determined according to the second TR configuration, and wherein the TR transmission may be transmitted at a second power level determined based on the first power level and on a power offset associated with the second TR configuration.

Although various embodiments are described and/or claimed herein in which an apparatus, system, device, etc. and/or any element thereof is configured to carry out an operation, process, algorithm, function, etc. and/or any portion thereof, it is to be understood that any embodiments described and/or claimed herein assume that any apparatus, system, device, etc. and/or any element thereof carries out any operation, process, algorithm, function, etc. and/or any portion thereof (and vice versa).

BRIEF DESCRIPTION OF THE DRAWINGS

A more detailed understanding may be had from the following description, given by way of example in conjunction with the accompanying drawings. Figures in such drawings, like the detailed description, are examples. As such, the Figures and the detailed description are not to be considered limiting, and other equally effective examples are possible and likely. Furthermore, like reference numerals in the figures indicate like elements.

FIG. 3 is a diagram illustrating an example of a method for enabling a tone reservation;

FIG. 4 is a diagram illustrating another example of a method for enabling a tone reservation;

FIG. 6 is a diagram illustrating another example of a method for enabling a tone reservation.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application. In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Example Communications Networks

Figure 1A:
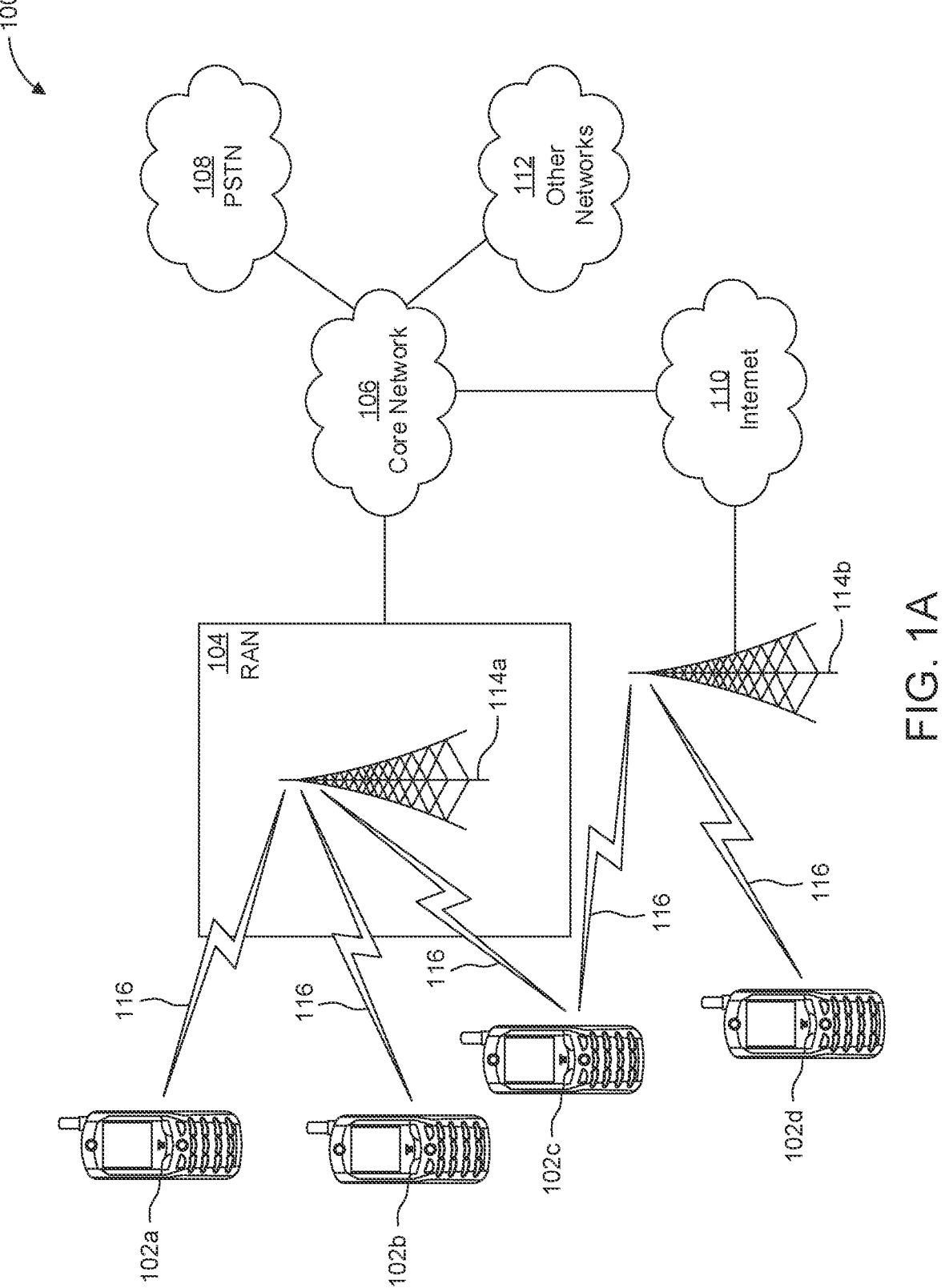
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or an "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, an NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
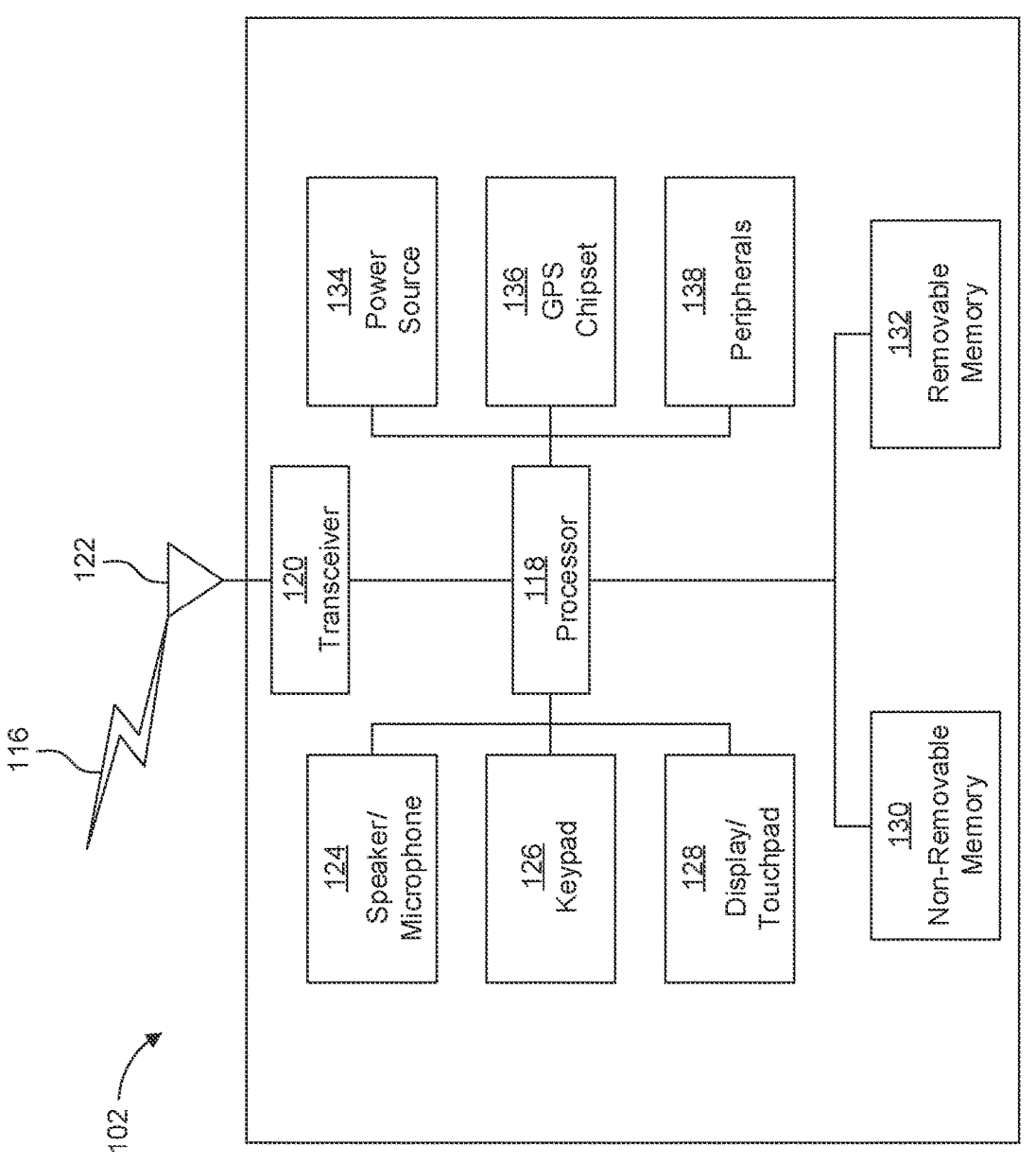
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special-purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full-duplex radio for which transmission and reception of some or all of the signals (e.g., associated with particular subframes for both the UL (e.g., for transmission) and downlink (e.g., for reception) may be concurrent and/or simultaneous. The full-duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
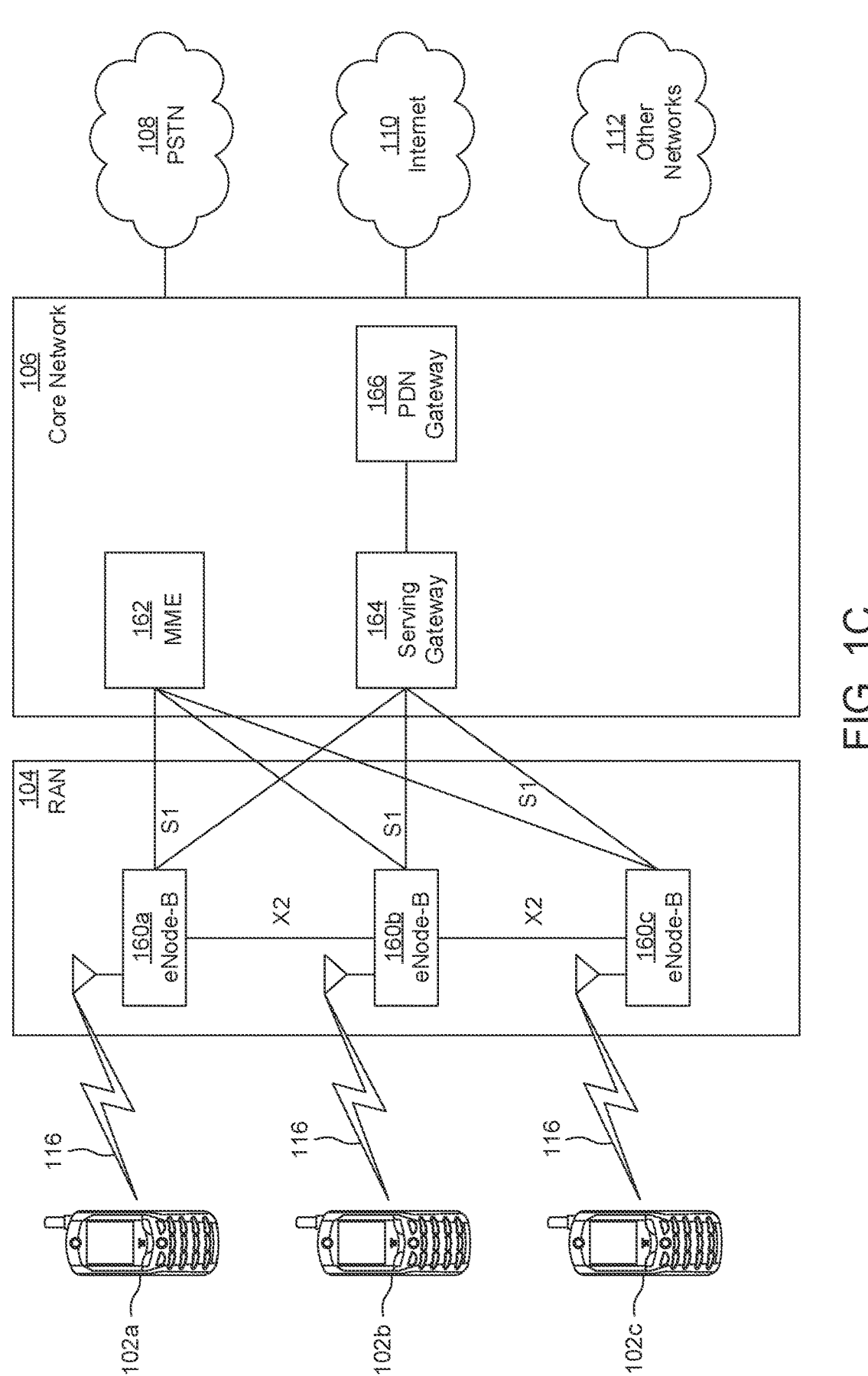
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing and time domain processing may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by an STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to an STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
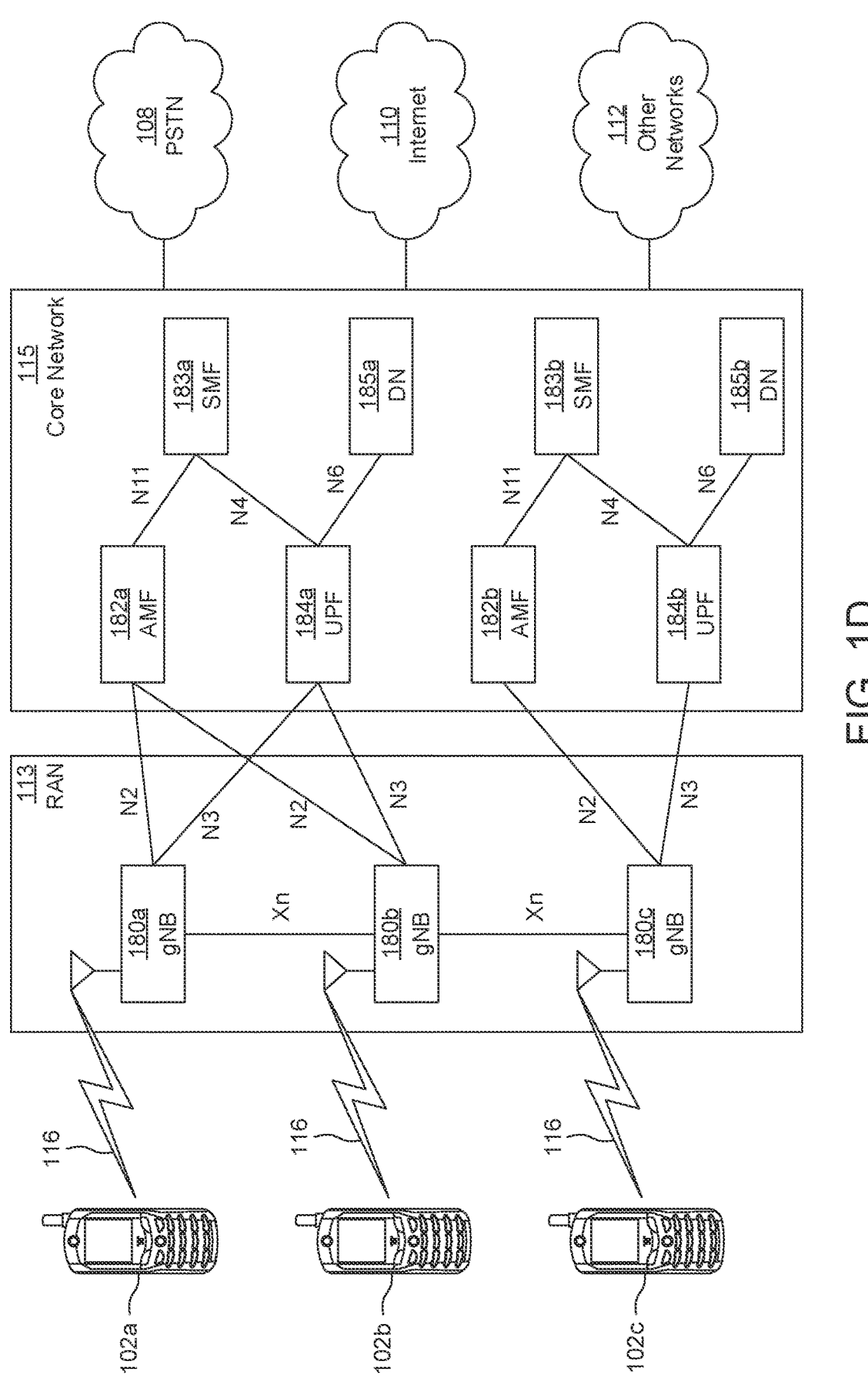
FIG. 1D is a system diagram illustrating a further example RAN and a further example of a CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements is depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized by WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184a, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented or deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented or deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

According to embodiments, a WTRU may reduce its transmission power, for example, to reach RF expectations, such as any of an adjacent channel leakage ratio (ACLR), an in-band emission (IBE) and an error vector magnitude (EVM). RF imperfections (e.g., leakage) may be reduced based on any of (e.g., advanced) waveforms and baseband techniques allowing a WTRU to increase its transmission power (and e.g., to increase the coverage). Tone reservation (TR) may be seen as a technique for reaching RF expectations without reducing the transmission power. Tone reservation may also be referred to herein as tone reduction (collectively TR). For example, TR may comprise reserving (e.g., a set of) sub-carriers apart (e.g., that may be different) from the sub-carriers used for data transmission. Reserved sub-carriers may be used to transmit a signal (e.g., a TR transmission) that may reduce the peak of data signal. For example, a higher number of reserved sub-carriers may result in a lower peak-to-average power ratio (PAPR). Reserving sub-carriers apart from the sub-carriers used for data transmission for reducing the peak of the data signal may be referred to herein as any of peak reservation tone and peak reduction tone, collectively PRT. The terms PRT and TR may be used interchangeably in embodiments described herein.

According to embodiments, (e.g., always) reserving a set of sub-carriers may reduce the spectral efficiency. According to embodiments, a WTRU may (e.g., be able to) increase its transmit power, for example, without reserving (e.g., a large number of) sub-carriers, or without any TR at all. Embodiments described herein may allow a WTRU to determine, for example, when TR may be performed (e.g., activated). Embodiments described herein may allow a WTRU to request TR from a serving base station (e.g., gNB), for example, along with parameters corresponding to the WTRU state (e.g., situation). Embodiments described herein are not limited to a gNB and may be applicable to any kind of serving base station.

Examples of Indicating a PRT Configuration from a gNB Under WTRU Assistance

According to embodiments, a PRT configuration may be indicated from a gNB under an assistance of a WTRU. For example, the WTRU may report (e.g., transmit) to the gNB a (e.g., desired) PRT configuration for any of a physical uplink shared channel (PUSCH) and a physical uplink control channel (PUCCH) transmission. According to embodiments, the WTRU may select the PRT configuration based on any of the following:

Target modulation and number of resource blocks (RB) (e.g., resource allocation); in a first example, a WTRU may report (e.g., transmit) a list of configurations corresponding to different allocations of any of modulation and coding scheme (MCS) and RB (e.g., a group of MCS values may correspond to a PRT configuration); in a second example, a WTRU may determine (e.g., predict) a UL grant allocation, and may report the corresponding PRT configuration (e.g., as any of one configuration and a subset of configurations);

Power headroom report (PHR); A PHR may (e.g., include a PH value that may) indicate how much transmission power may be available for a WTRU to use in addition to the power being used by a (e.g., current) transmission;

WTRU capability, e.g., any of WTRU processing capability, power class;

Configured maximum WTRU output power (PCmax);

Measurements of reference signals (RS); in case of reciprocity (e.g., UL and DL using similar frequency bands), DL RS may be used;

Type of intended transmission (e.g. physical random-access channel (PRACH), Msg2);

Operating band.

According to embodiments, for any of requesting and reporting PRT configuration(s), a WTRU may use any of a (e.g., new, specific) MAC control element (CE), uplink control information (UCI), along with (e.g., included in) a PHR (e.g., using a specific power headroom (e.g., range of) value), and a radio resource control (RRC) signaling (e.g., message).

According to embodiments, a WTRU may receive a PRT configuration based on (e.g., using) any of an RRC configuration, a downlink control information (DCI), a MAC CE. For example, the processing time of the grant may depend on the received PRT configuration.

According to embodiments, a PRT configuration may include any of a number of subcarriers (e.g., RBs) reserved for PRT, a location of the reserved subcarriers (e.g., RBs) within any of the bandwidth part and the carrier component (CC), a power offset between a power used in data RBs and a power used in subcarriers (e.g., RBs) for PRT.

According to embodiments, a WTRU may be (e.g., triggered to) report its (e.g., desire of) PRT configuration, for example, after performing initial transmissions, and determining that more power may be needed. In another example, the WTRU may be (e.g., triggered to) report its (e.g., desire of) PRT configuration based on a network congestion (e.g., based on some measurements). In yet another example, the WTRU may be (e.g., triggered to) report its (e.g., desire of) PRT configuration based on receiving a group common signaling.

Examples of WTRU Autonomous Selection of PRT Configuration and Enabling/Disabling of the Feature According to embodiments, a WTRU may be configured with at least two grants (e.g. one with PRT enabled and another one without PRT). For example, the WTRU may select one of them and may indicate the selection to the gNB (any of implicit and explicit).

According to embodiments, the PRT frequency resources (e.g., tones) may be inside the resource allocated for the UL grant. For example, a set of RBs may be configured (e.g., allocated) to the WTRU, which may select the number of PRT to be applied and may indicate (e.g., transmit) the PRT parameters e.g., used for an UL transmission to the gNB.

Terminology

Throughout embodiments described herein, a property of scheduling information (e.g., an uplink grant or a downlink assignment) may comprise any of the following:

A frequency allocation;

An aspect of time allocation, such as e.g., a duration;

A priority;

A modulation and coding scheme;

A transport block size;

A number of spatial layers;

A number of transport blocks to be carried;

A transmission configuration indication (TCI) state or sounding reference signal (SRS) resource indicator (SRI);

A number of repetitions;

Whether the grant may be a configured grant type 1, type 2 or a dynamic grant.

Whether the repetition scheme may be Type A or Type B;

Whether the grant may be a configured grant type 1, type 2 or a dynamic grant;

A configured grant index or a semi-persistent assignment index;

A periodicity of a configured grant or assignment;

A channel access priority class (CAPC);

Any parameter provided in a DCI, by MAC or by RRC for scheduling the grant or assignment.

Examples of Peak Tone Reduction

According to embodiments, a WTRU may reduce its transmission power, for example, to reach RF expectations, such as any of ACLR, IBE and EVM. A power reduction may result in a reduced coverage for UL channels. For example, coverage may be increased by reducing the RF imperfections (e.g., leakage) so that the WTRU may (e.g., be enabled to) transmit with higher power. In another example, using any of (e.g., advanced) waveforms and some baseband techniques, the WTRU may reduce the leakage on adjacent channels leading to higher transmission power e.g., without causing interference in the adjacent channels. TR techniques may allow a WTRU to reach (e.g., meet) the RF expectations, e.g., allowing the WTRU to increase the transmission power. TR (e.g., PRT) techniques may comprise reserving (e.g., a set of) sub-carriers apart (e.g., that may be different) from the sub-carriers used for any other (e.g., data) transmission. The reserved sub-carriers may be used to transmit a signal that may reduce the peak of data signal and thus may reduce the PAPR. A signal for obtaining (e.g., achieving) a (e.g., given) PAPR value may be based on different techniques. A (e.g., large) number of reserved sub-carriers may result in lower PAPR and cubic metric. For example, the signal may be based on the method disclosed by Y. Wang, W. Chen and C. Tellambura in "Genetic Algorithm Based Nearly Optimal Peak Reduction Tone Set Selection for Adaptive Amplitude Clipping PAPR Reduction", published in IEEE Transactions on Broadcasting, vol. 58, no. 3, pp. 462-471, in September 2012. In another example, the signal may be based on the method "Subcarrier Power Adjustment Technique for Peak-to-Average Power Ratio Reduction of OFDM Systems" disclosed by Y Rajbanshi, Rakesh & Wyglinski, A. M. & Minden, Gary in IEEE Military Communications Conference in 2006. In another example, the signal may be based on the method "Peak to average power ratio reduction for digital video broadcast T2, disclosed by Barsanti, Robert & Larue, James in 2011 Proceedings of IEEE Southeastcon.

Figure 2:
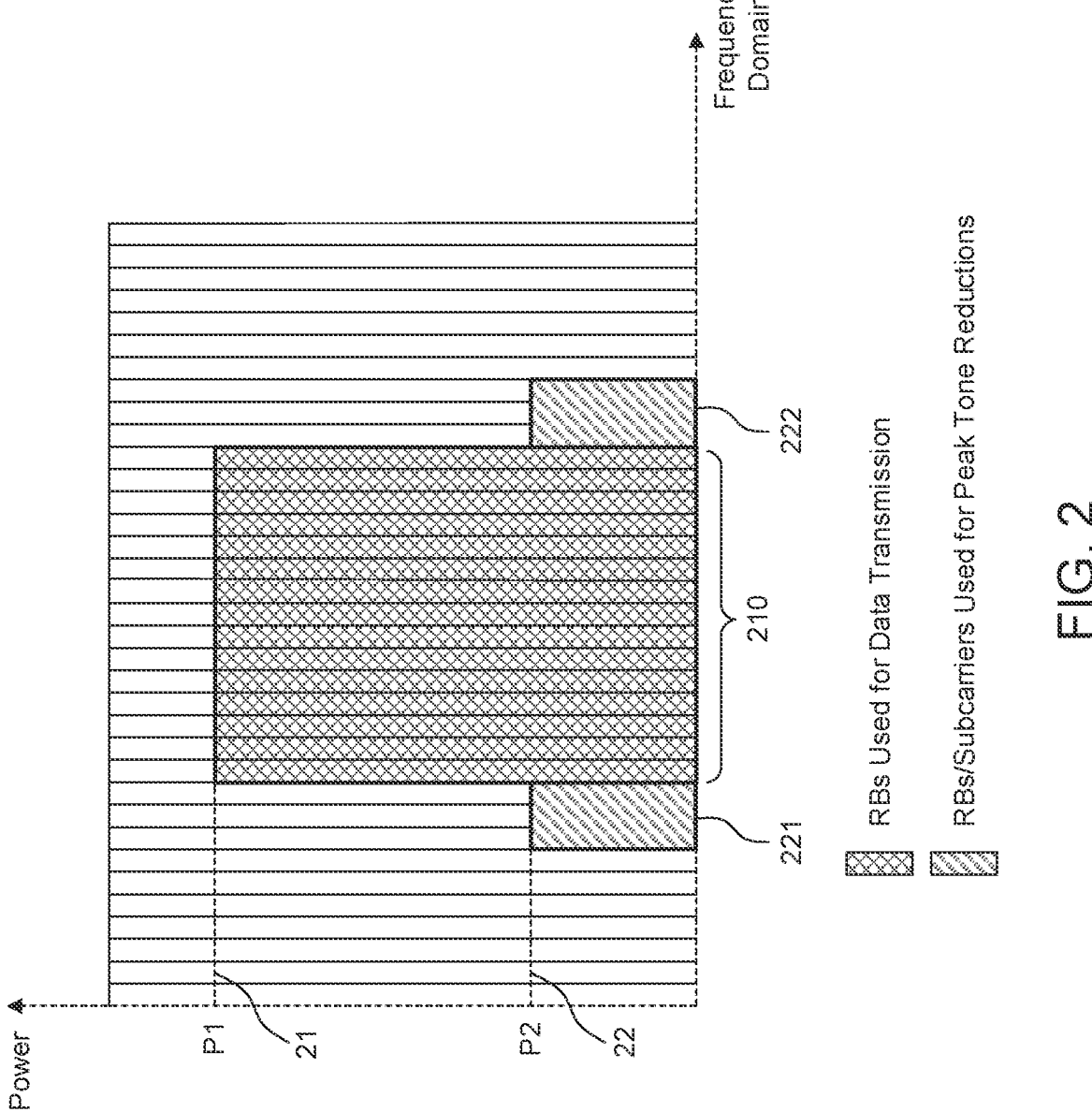
FIG. 2 is a diagram illustrating an example of a peak tone reduction technique.

FIG. 2 is a diagram illustrating an example of a peak tone reduction technique. FIG. 2 shows an example where six subcarriers may be used in the edge of a set of data RBs 210. A set of three subcarriers 221, 222 may be used (e.g., reserved) at each side of the set of data RBs 210. The data signal (e.g., corresponding to the set of data RBs 210) may be transmitted with a power level 21 e.g., equal to P1. The peak tone reduction (e.g., signal) may be transmitted with a power level 22, e.g., equal to P2 (lower than P1).

According to embodiments, (e.g., always, systematically) reserving a set of sub-carriers for PRTs may reduce the spectral efficiency of the system since those PRT resources may not be used for data transmission and may be considered as overhead. According to embodiments, a WTRU may (e.g., be able to) increase its transmission power, without using any number of reserved sub-carriers/resource blocks for the tone reservation feature. According to embodiments, the number of (e.g., needed) resources for PRT may depend on any of the WTRU available power, target performance (e.g. target block error rate (BLER)) and WTRU's capability. Embodiments described herein may allow a WTRU to determine when to perform tone reservation and how tone reservation may be requested from the gNB. Embodiments described herein may also allow the WTRU to determine the parameters to be used for its different operating scenarios (e.g., situations).

WTRU Assisting the gNB to Configure PRT

PRT Configuration Examples

According to embodiments, a WTRU may be (e.g., pre) configured with (e.g., receive PRT configuration information indicating) any number of PRT configurations. For example, a PRT configuration may be signaled semi-statically e.g., using any of RRC signaling and a system information block (SIB). For example, during initial access, a WTRU may be configured using SIB to use PRT in PRACH channels. In another example, the PRT configurations (e.g., information) may be received e.g., dynamically. For example, a DCI may indicate a set of PRT configurations that may be supported from the gNB for any of a period of time and a set of slots. A PRT may be shared among different WTRUs or dedicated to a (e.g., single) WTRU. For example, a PRT configuration signaled using WTRU RRC (e.g., common) signaling may be shared among WTRUs. A PRT configuration (e.g., information) may include any number of the following parameters (e.g., information, indications):

A number of any of subcarriers and resource blocks (RBs) reserved (e.g., to be used) for PRT transmission.

Power offset between the power to be used in RBs for data and the power to be used in any of RBs and subcarriers for PRT. The power offset may be, for example, a function of any of the configured subcarrier spacing, bandwidth, and PRT resource allocation within (e.g., associated with) any of a component carrier and a bandwidth part.

Location of the reserved subcarriers within (e.g., associated with) any of the bandwidth part and the carrier component. For example, a WTRU may be configured with any of sub-carriers and RBs for PRT (e.g., signal) transmission that may be located at the edge of the bandwidth that may be used for data transmission.

Corresponding set of RBs that may be used for data transmission for a reserved peak reduction tone(s).

Any of subframe(s) and slot(s) where the configuration may apply.

Any of a periodicity and an offset in time domain of PRT. For example, the offset may be any of a time offset and a symbol offset (e.g., an offset in terms of symbols). For example, a WTRU may (e.g., be configured to) apply the PRT configuration with a (e.g., specified, indicated) periodicity. In a case where an UL grant overlaps in the time domain with the (e.g., configured) PRT periodicity, the WTRU may apply PRT (e.g., transmit information comprising a data transmission and a PRT transmission). Otherwise, the WTRU may transmit (e.g., data according to) the UL grant without any PRT transmission.

Subcarrier spacing that the WTRU may apply to the PRT.

Any of a bandwidth part index and a CC index.

An algorithm or method to generate the PRT, including e.g., algorithm (e.g., method) parameters, such as any of coefficients and a matrix.

Block Interleaver to generate the tones of PRT.

The density of the PRTs, for example, indicating whether they may be contiguous or non-contiguous and how they may be spread. For example, some WTRUs may support tones (e.g., PRT transmission(s)) that may be adjacent to the UL grant and other WTRUs may support (e.g., both) contiguous and non-contiguous e.g., as a capability. The WTRU may indicate to the network the support of such capability, e.g., by transmitting capability information indicating whether a PRT transmission may be any of contiguous and non-contiguous with a data transmission.

Transmit power control (TPC) step size.

Figure 5:
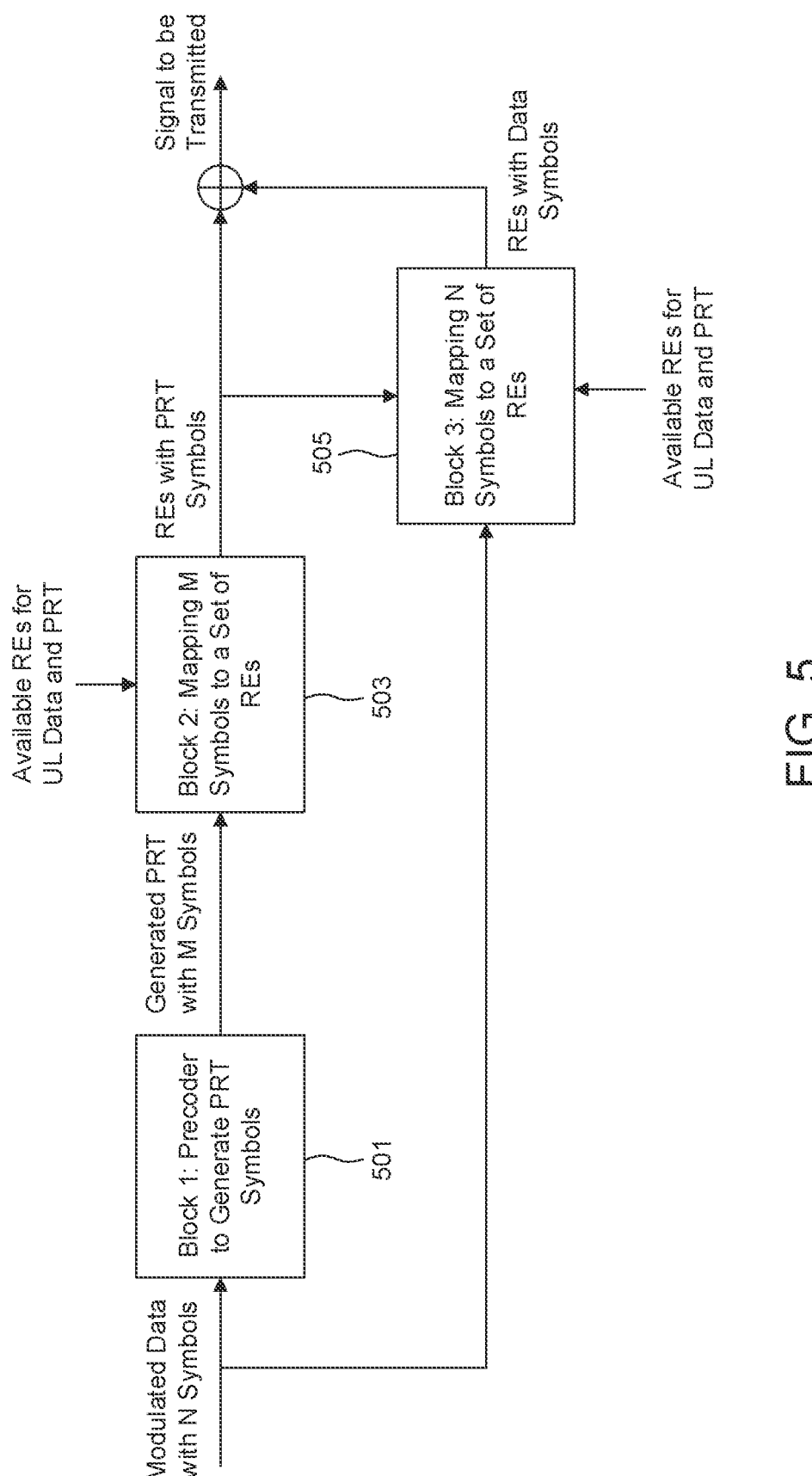
FIG. 5 is a diagram illustrating an example of the use of the modulated data symbols to generate the PRT symbols.

Precoder ratio R (discussed further below in connection with FIG. 5).

According to embodiments, a PRT configuration may be identified with an identifier, such as e.g., an index. For example, a WTRU may be preconfigured with a table comprising a list of PRT configurations, where a configuration may be represented by e.g., a raw, and different columns may represent different parameters of the PRT configurations. For example, the row index in the table may identify (e.g., be used as an identifier of) the PRT configuration. Any data structure capable of representing a set of PRT configurations, wherein a configuration may be identified by an identifier and may comprise different parameters as described herein, may be applicable to embodiments described herein.

Examples of Triggers to Request PRT Configuration and/or Transmit Assisting Information According to embodiments, a WTRU may receive an indication from the gNB to request a PRT configuration. According to embodiments, a WTRU may receive an indication from the gNB to transmit a report including (e.g., assisting) information that may assist (e.g., be used by) the gNB to configure the WTRU with PRT. For example, the gNB may control when the WTRU may request PRT and/or may provide (e.g., assisting) information. A WTRU may be (e.g., triggered to) any of sending assisting information and requesting (e.g., transmitting information indicating a selected) PRT configuration by any of the following:

Receiving a (e.g., WTRU specific) DCI. For example, the gNB may send a DCI containing an indication (e.g., a bitfield) that may request (e.g., transmission of) any of assisting information and PRT configuration request.

Receiving a MAC CE. For example, a WTRU may receive a MAC CE that may request a (e.g., preferred) PRT configuration.

Power limited situation. For example, after performing UL transmissions, a WTRU may determine that more power may be involved to e.g., achieve a performance target. In one example, a WTRU may determine to be in a power limited situation (e.g., configuration, operation mode) based on any of the following:

Transmitting at a (e.g., maximum) power for a (e.g., configured, configurable) period of time. For example, a WTRU may be configured to start a timer after it may have (e.g., started to) transmit with the (e.g., maximum) power. The WTRU may be configured to reset the timer in a case where the WTRU may be transmitting with a lower power than the (e.g., maximum) power. After (e.g., upon) the timer expiry, the WTRU may determine that the WTRU may be in a power limited situation (e.g., configuration, operation mode).

A (e.g., transport, data) block may be retransmitted with a number of retransmissions above a (e.g., configured, configurable threshold) value. For example, a WTRU may be configured with a number N of retransmissions (N being any integer value greater than 1). Upon retransmitting (e.g., after having retransmitted) a (e.g., transport, data) block N times, the WTRU may determine that the WTRU may be in a power limited situation (e.g., configuration, operation mode).

Path loss may be above a (e.g., configured, configurable threshold) value. For example, a WTRU may determine that its path loss may be above the (e.g., configured, configurable threshold) value based on measurements of any of a synchronization signal block (SSB), channel state information reference signals (CSI RS), positioning reference signals, and any other configured reference signal. For example, a WTRU may (e.g., be configured to) determine it may be in a power limited situation (e.g., configuration, operation mode) on a condition that a (e.g., measured) received power of the reference signals is below a (e.g., configured, configurable threshold) value for a (e.g., configured, configurable) period of time.

PH value. For example, a WTRU may be configured to trigger (e.g., a transmission of) any of a PRT request and assisting information in case its PH value is equal or less than a (e.g., configured, configurable) value (e.g., threshold). For example, a WTRU may be configured to request PRT configuration in a case where its power headroom (e.g., value) is equal (e.g., close) to zero.

Determine the network congestion. A WTRU may be configured to determine if the network may be congested or not and to enable PRT (e.g., feature) if the network is not congested. For example, a V2X WTRU may (e.g., be configured to) determine whether the sidelink may be congested and may transmit any of a PRT request and assisting information to the gNB in a case where the sidelink is not congested.

Receiving a group common signaling. For example, a WTRU may (e.g., be configured to) receive a group common DCI scrambled with a common radio network identifier (RNTI) to trigger the WTRU to send any of a PRT request and assisting information. In another example, a WTRU may (e.g., be configured to) receive a system information update that may carry the triggering of PRT request.

Throughout embodiments described herein the expressions "PRT request", "PRT configuration request", "request for a PRT configuration", "report of a desired PRT configuration", "indication of a selected (e.g., requested) PRT configuration" and "information indicating a (e.g., selected) PRT configuration" may be used interchangeably to designate information that may be sent by a WTRU to a serving base station to request (e.g., operating in) a PRT configuration.

According to embodiments, a WTRU may (e.g., be configured to) transmit a sounding reference signal (SRS) e.g., along with any of assisting information and a PRT configuration request. The SRS transmission may allow the gNB to determine the channel condition of the WTRU e.g., for selecting the (e.g., appropriate) PRT configuration for the WTRU. For example, a WTRU may be configured with (e.g., receive SRS configuration information indicating) a mapping (e.g., a set of associations) between an SRS configuration and a (e.g., desired) PRT configuration(s). By receiving the corresponding SRS, the gNB may determine the requested PRT configuration (e.g., the PRT configuration that may be requested by the WTRU). In other words, by transmitting a SRS associated with a specific TR configuration, the WTRU may indicate a request for that specific PRT configuration. In another example, an SRS resource may be configured e.g., by the gNB in the WTRU (e.g., by sending SRS configuration information) for the purpose of indicating a PRT feature request. For example, SRS configuration information may indicate that a PRT configuration may be associated with any of at least one SRS and at least one SRS resource. For example, the WTRU may transmit (e.g., an SRS) in the configured SRS resource for requesting enabling the PRT feature (e.g., configuration).

Examples of WTRU Reports of desired PRT Configuration(s)

According to embodiments, a WTRU may (e.g., be configured to) report (e.g., transmit information indicating) a (e.g., desired, expected) PRT configuration after the WTRU may have been triggered as described herein. For example, the WTRU may report (e.g., transmit) to the gNB the (e.g., desired) PRT configuration e.g., for any of a configured PUSCH/PUCCH transmission(s) and an expected PUSCH transmission. According to embodiments, the WTRU may determine the (e.g., desired, expected) PRT configuration based on any of the following:

Any of a modulation and a number of RB. For example, the WTRU may indicate the (e.g., desirable) number of subcarriers for PRTs based on the (e.g., target) modulation.

In a first example, the WTRU may report a list of (e.g., desired) PRT configurations corresponding to different (e.g., supported) MCS and frequency resources (e.g., RB) allocation. For example, the WTRU may report for a (e.g., each) MCS value a desired PRT configuration. In another example, the WTRU may report a (e.g., desired) PRT configuration for (e.g., a group of) MCS values.

In a second example, the WTRU may determine (e.g., and/or predict) the UL grant allocation and may report a corresponding (e.g., desired) PRT configuration. For example, the WTRU may be configured with a configured grant (CG) transmission. The WTRU may report a (e.g., preferred, desired) PRT configuration that may correspond to the MCS and RB allocation of the CG configuration. In another example, the WTRU may obtain (e.g., predict) the number of allocated RBs and MCS e.g., based on its buffer status report and reported channel state information and may request a PRT configuration corresponding to the (e.g., predicted) number of allocated RBs and MCS.

Available power headroom. For example, the WTRU may determine the available PH based on a power level for a previous transmission. In another example, the WTRU may determine a PH based on an uplink grant (e.g., estimating the power level to be used for an upcoming transmission based on uplink grant information associated with the uplink grant (e.g., any of RB allocation and MCS). For example, based on the (e.g., available) PH a WTRU may determine the (e.g., desirable) power offset between the transmit power in data subcarriers/RBs and transmit power in PRT subcarriers/RBs.

Used transmit power in previous UL transmission(s). For example, based on the used power in previous transmission(s), a WTRU may indicate a (e.g., desirable) number of subcarriers for PRT for a subsequent UL transmission. The (e.g., desirable) number of subcarriers may allow the WTRU to increase the transmit power in the next UL transmissions.

WTRU capability. For example, based on its processing capability, a WTRU may indicate the PRT configuration that may be desirable for a next (e.g., upcoming) transmission.

Power class. For example, a WTRU with higher power class may not request performing PRT in a case where it determines that a (e.g., target) performance may be reached with its channel conditions and its (e.g., maximum) transmit power.

Measurements of reference signals. For example, in case of reciprocity (e.g., similar channel conditions for UL and DL), DL RS may be used to determine the channel condition of UL channel. In a case where channel conditions degrade, a WTRU may request PRT configuration.

Received TPC command. For example, a WTRU may request PRT configuration in a case where it receives N consecutive TPC commands for increasing the transmit power, N being an integer number greater than one.

Type of intended transmission (e.g., PUCCH, PUSCH, PRACH). For example, a WTRU may request a different PRT configuration for PUCCH than PUSCH.

Operating band.

Target BLER for the UL transmission(s). For example, for enhanced mobile broadband (eMBB) type of service that may expect high BLER target, a WTRU may request a (e.g., large) number of reserved subcarriers.

The closest PRT configuration to the UL grant. For example, a WTRU may be configured with (e.g., receive PRT configuration information indicating) multiple PRT configurations, where each PRT configuration may have a different frequency allocation. For example, the WTRU may select the PRT configuration with a frequency allocation that may be the closest to the uplink grant frequency allocation.

A WTRU may be (pre)configured with (e.g., may receive PRT configuration information indicating) a set of PRT configurations, where e.g., each configuration may be identified by an index. According to embodiments, the WTRU may indicate to the gNB (e.g., transmit information indicating) the selected (e.g., desired) PRT configuration using, for example, a bitfield in the UCI, pointing to one of the PRT configuration by its index, to indicate the selected (e.g., desired) PRT configuration.

Examples of WTRU Reports of Assisting Information

According to embodiments, a WTRU may be configured to transmit (e.g., assisting) information to the gNB that may allow the gNB to determine (e.g., select) an (e.g., adequate) PRT configuration. For example, (e.g., assisting) information may include the power offset between the power levels respectively used for data RB and for RB tones transmission.

According to embodiments, a WTRU may be configured to report (e.g., transmit) PHR (e.g., including a PH value(s)) to the gNB as part of the assisting information sent to the gNB. According to embodiments, a range of PH values may be associated with a PRT configuration. A WTRU may be configured with (e.g., receive configuration information indicating) a mapping (e.g., a set of associations) between PH values and PRT configurations. A WTRU may select a PRT configuration based on the corresponding PH range/value that may be available to the WTRU.

Examples of Transmitting PRT Requests and/or Assisting Information

According to embodiments, a WTRU may (e.g., be configured to) use any of the following to request a PRT configuration(s) and/or report assisting information:

A MAC CE. In a first example, a WTRU may (e.g., be configured to) use a (e.g., dedicated, specific) MAC CE (e.g., in a transmission) to request PRT configuration and/or indicate an assisting information. In another example, a WTRU may (e.g., be configured to) use one of the (e.g., existing) MAC CEs to jointly report a (e.g., desired) PRT configuration along with additional information. For example, a WTRU may (e.g., be configured to jointly) transmit PH (e.g., value(s)) and a (e.g., desired) PRT configuration in the same MAC CE.

A (e.g., dedicated, specific) UCI format, for example, a flag within UCI.

A WTRU may (e.g., be configured to) use RRC signaling to report (e.g., transmit information indicating) a (e.g., desired) PRT configuration.

According to embodiments, a WTRU may (e.g., be configured to) multiplex the PRT request (e.g., information indicating a selected PRT configuration) with other UCI information, such as e.g., any of scheduling request (SR) information, hybrid automatic repeat request acknowledge (HARQ-ACK) feedback information, and a CSI (e.g., report). For example, a WTRU may be configured with PUCCH to transmit UCI (e.g., information) (e.g., HARQ ACK feedback). In a case where the WTRU determines (e.g., is triggered) to transmit the PRT request, the WTRU may select a (e.g., the first) PUCCH opportunity (e.g., available after the trigger) and may multiplex the PRT request with the UCI (e.g., information) on the PUCCH resource. In another example, a WTRU may be configured with a transmission of UCI (e.g., information) on the PUSCH. The WTRU may use the UCI transmission (e.g., resource) on PUSCH and may multiplex the PRT request with the UCI (e.g., transmission) on the PUSCH. For example, a WTRU that may be configured to transmit UCI (e.g., information) on any of the PUCCH and the PUSCH may multiplex a PRT request (e.g., information indicating a selected PRT configuration) with the UCI (e.g., information to be transmitted). The WTRU may transmit the UCI (e.g., information) multiplexed with the PRT request on any of the PUCCH and PUSCH.

Examples of Receiving a PRT Configuration

According to embodiments, a WTRU may be (e.g., semi-statically) configured with (e.g., may receive first configuration information including) a first set of parameters. According to embodiments, a WTRU may be (e.g., dynamically) configured with (e.g., may receive second configuration information including) a second set of parameters, e.g., based on any number of DCI fields (e.g., information). According to embodiments, a WTRU may (e.g., be configured to) receive any of a PRT configuration (e.g., information) and any parameter(s) associated with a PRT configuration by any of:

Receiving (e.g., using) at least one indication included in (e.g., at least one dedicated bitfield in) the DCI. In a first example, a WTRU may receive a PRT configuration index pointing to one (e.g., any) of the (e.g., preconfigured) PRT configurations. In another example, the PRT configuration, that may be indicated in the DCI, may be relative to another indication in the DCI. For example, the PRT configuration, that may be indicated in the DCI may be relative to the indicated frequency domain resource allocation (FDRA) field. For example, the (e.g., bitfield in the) DCI may indicate that a number of RBs (e.g., two RBs) may be reserved for (e.g., allocated to) PRT. The WTRU may determine the frequency location of the PRTs as a function of the indicated RBs for data (e.g., at the edge of the RBs used for data transmission). In another example, a (e.g., specific, given) field may (e.g., directly, explicitly) indicate a frequency allocation for the PRTs.

Receiving (e.g., using) at least one indication included in (e.g., an existing bitfield in) the DCI. For example, an FDRA information (e.g., field) in the DCI may include any of PRT resource allocations and data resource allocations. For example, the WTRU may determine the subset of RBs to be used for PRT within that resource (e.g., frequency) allocation based on an (e.g., implicit) rule. For example, a number of RBs may be located at the edges of the resource (e.g., frequency) allocation, where the number of RBs may be any of configured (e.g., by higher layers), indicated in a DCI field, and (e.g., implicitly) determined based on the total number of RBs indicated in the FDRA field, e.g., according to a pre-defined rule)

Receiving a MAC CE indicating a PRT configuration;

RRC configuration. For example, after transmitting assisting information to the gNB, the WTRU may receive the PRT configuration for a configured grant (e.g., of type 1) using RRC reconfiguration.

According to embodiments, at least one parameter of the PRT configuration may depend on a property of the grant. For example, the number of RBs (e.g., to be used) for PRT may depend on the number of RBs allocated in the grant. For example, the number of RBs for PRT may be based on any of a (e.g., pre-defined) relationship (e.g., table, associations) and a (e.g., higher layer) configuration. For example, the location(s) of RBs for PRT may (e.g., implicitly) be relative to any of the smallest RB and highest RB of the allocation.

According to embodiments, a WTRU may process (e.g., interpret) the timing indication of the uplink grant based on the PRT configuration (e.g., K2 indication in the DCI). A K2 indication may be carried in the DCI that may be scheduling an uplink grant. A K2 indication may indicate the timing of the scheduled UL transmission relative to the timing of receiving DCI. For example, a WTRU receiving a DCI (e.g., scheduling UL grant) in slot n with K2=4, may perform the UL transmission in slot n+4. For example, the WTRU processing time of the UL grant may vary (e.g., significantly) from one PRT configuration to another. Processing (e.g., interpreting) a K2 value differently from one PRT configuration to another may allow to avoid transmitting a timing indication supporting all possible values (e.g., which may be based on a large field size).

According to embodiments, a WTRU may be configured with (e.g., configured) grant transmission. For example, the WTRU may start monitoring DCI that may include PRT configuration after any of transmitting assisting information and requesting PRT configuration.

According to embodiments, the WTRU may use (e.g., a) different PCmax value(s) associated with (e.g., a) different PRT configuration(s). For example, in a case where the WTRU any of reports, requests, and evaluates a PRT configuration, the WTRU may apply a different PCmax value associated with a different PRT configuration.

According to embodiments, the WTRU may determine the power control parameters for uplink transmission based on the enabled (e.g., configured) PRT configuration. For example, in closed loop power control, the WTRU may determine the transmit power control command (TPC) step size based on the enabled PRT configuration. For example, a WTRU may be (e.g., pre) configured with (e.g., receive information indicating) a TPC step size along (e.g., associated with) the PRT configuration. In a case where the WTRU receives (e.g., information indicating) a PRT configuration, the WTRU may assume (e.g., use) the corresponding TPC command (e.g., based on the associated TPC step size).

According to embodiments, the WTRU may determine the MCS table for uplink transmission based on the enabled (e.g., configured) PRT configuration. The WTRU may be configured with (e.g., receive information indicating) multiple (e.g., any number of) MCS tables, where each one may be associated with a PRT configuration. In a case where the WTRU receives a PRT configuration, the WTRU may assume (e.g., use, transmit based on) the corresponding MCS table (e.g., associated with the received PRT configuration).

Examples of Reporting PHR with Additional Information (Extended PHR)

According to some embodiments, a WTRU may (e.g., be configured to) report (e.g., transmit) regular PHR (e.g., PH value(s)) which may be obtained (e.g., computed) using the normal (e.g., current) PCmax value and a new PCmax value that may correspond to any of the selected and preferred PRT configuration. For example, a WTRU may (e.g., be configured to) report (e.g., transmit information indicating a first difference value computed using) the difference between the normal (e.g., current) PCmax and the new PCmax that may correspond to any of the selected and preferred PRT configuration. In another example, a WTRU may (e.g., be configured to) report (e.g., transmit) both the regular PHR (e.g., PH value(s)) and additional PHR information that may be computed by the WTRU assuming that (e.g., in a case where) any of the selected and preferred PRT configuration is enabled. A WTRU may (e.g., be configured to) report (e.g., transmit information indicating a second difference value computed using) the difference between the normal (e.g., current) PH value and this new PH value corresponding to (e.g., determined based on) any of the selected and preferred PRT configuration. In another example, a WTRU may (e.g., be configured, transmit information to) indicate whether the use of the PRT feature may allow the WTRU to increase the transmit power and how much the WTRU may gain in power. For example, the WTRU may transmit power information associated with a transition from the normal (e.g., current) PRT configuration to any of the selected and preferred PRT configuration. For example, the power information may include power gain information indicating a (e.g., transmit) power gain associated with the transition. For example, the WTRU may indicate the power difference (e.g., gain) in dB.

The WTRU may use the same transport blocks (TBs) to report (e.g., transmit) the PHR (e.g., PH value(s)) and the additional information described above. A WTRU may use the same MAC CE to report (e.g., transmit) the PHR (e.g., PH value(s)) and the additional information. For example, a WTRU may (e.g., transmit information to) indicate to the gNB using any of a flag and a bitfield that PHR with additional information (extended PHR) may be transmitted (e.g., 0 may indicate regular and 1 may indicate an extended PHR, any other value may be applicable to embodiments described herein). In another example, the WTRU may use a separate MAC CE to transmit the additional information. For example, regular PHR (e.g., PH value(s)) may be transmitted using a first MAC CE and any of new PCmax information (e.g., value) and new PH information (e.g., value(s)) corresponding to any of the selected and preferred PRT configuration may be transmitted using a second MAC CE.

Examples of Transmitting UL TB Using a PRT Configuration

According to embodiments, a WTRU may transmit any number of UL TBs based on a PRT configuration. After receiving a PRT configuration (e.g., information), a WTRU may use the PRT subcarriers/RBs to transmit a signal (that may be referred to herein as a PRT signal), that may be different from a data signal. In a first example, the PRT signal may be generated (e.g., transmitted) based on the (e.g., intended) uplink data transmission, e.g., to reduce (e.g., minimize) the PAPR of the sum of PRT signal and data signal. In a second example, the PRT signal may be generated (e.g., transmitted in such a way to reduce (e.g., minimize) the cubic metric of the sum of the data signal and PRT signal.

Example of a Method for Enabling Tone Reservation

FIG. 3 is a diagram illustrating an example of a method 300 for enabling a tone reservation. According to embodiments, in a step 310, a WTRU may be configured, for example, with a CG transmission (e.g., receive a CG configuration) with a number of allocated RBs and MCS. For example, the WTRU may receive uplink grant information (e.g., CG configuration) associated with an uplink grant, the uplink grant information indicating any of a number of allocated RBs and MCS. For example, the CG configuration (e.g., the uplink grant) may allow the WTRU to transmit with a first (e.g., maximum) power.

According to embodiments, in a step 320, the WTRU may determine it may operate in a power limited situation (e.g., configuration, operation mode), based on, for example, any of an (e.g., estimated) path loss and a transmitted power (e.g., used for previous transmissions).

According to embodiments, in a step 330, the WTRU may determine a (e.g., preferred) configuration based on any of CG grant properties (e.g., MCS and RB allocation) and available power headroom. For example, the WTRU may determine, e.g., based on its available power headroom (e.g., zero available power headroom), whether it may involve (e.g., need) more transmit power. For example, the WTRU may determine e.g., based on its power class the number of subcarriers/RBs for the configured grant transmission to achieve (e.g., reach, obtain) a target BLER.

According to embodiments, in a step 340, the WTRU may send any of a PRT request and assisting information to the gNB. Any of the PRT request and the assisting information may indicate the determined (e.g., preferred) PRT configuration.

According to embodiments, in a step 350, the WTRU may monitor a DCI, e.g., reconfiguring the CG configuration with PRT feature (e.g., configuration).

In example scenario, a WTRU may receive (e.g., first uplink grant information associated with) a first UL grant and may determine that the conditions to request PRT may be satisfied. For example, the WTRU may determine to be in a power limited situation. For example, the WTRU may determine that a power condition may be satisfied, e.g., based on any of the measured path loss, the used transmitted power for a configured period, and the (e.g., available, determined) PH. For example, the WTRU may select a (e.g., preferred) PRT configuration and may send information indicating the selected PRT configuration to the gNB, for example, using any of the current grant (e.g., the first UL grant) and a later (e.g., further) grant. For example, the WTRU may receive (e.g., second UL grant information associated with) a second UL grant from the gNB with the (e.g., preferred, selected) PRT configuration enabled.

Examples of a WTRU Autonomously Enabling PRT

According to embodiments, a WTRU may (e.g., autonomously) enable PRT for reducing PAPR. For example, the WTRU may indicate (e.g., declare) in its capabilities, that it may be capable of (e.g., autonomously) enabling PRT. As PAPR may be dependent on RB allocation and modulation type, a PRT capability may be represented, for example, in a form of a table mentioning (e.g., indicating) the modulation and the number of RBs reserved for PRT on the edges of a contiguous allocation. For example, a PRT allocation granularity may go down to a resource element (RE) level for e.g., an allocation at the RB level and a modulation type. According to embodiments, in a case where a WTRU uses a PRT technique for its UL transmissions, the gNB may know (e.g., be indicated) which UL resources may be used by the WTRU for PRT in order to e.g., cancel them and retrieve (e.g., only) the UL data modulated resources. For example, the gNB may determine the locations of the RBs used for data and the RBs used for PRT. The gNB may process data and discard the PRT signal based on the determined locations.

According to embodiments, a gNB may receive a WTRU capability message from a WTRU indicating the PRT capabilities of the WTRU. The gNB may use these capabilities in a case where the WTRU reaches any power limited situation (e.g., configuration, operation mode), such as e.g., any of zero power headroom and power scaling situations. After determining that a WTRU may be in a power limited situation (e.g., configuration, operation mode), the gNB may start scheduling the WTRU with alternative grants, for example, one with PRT tones and one without PRT tones, allowing the WTRU to choose between both grants, e.g., based on its power limited estimations. Such alternative two grants may be referred to herein as a dual grant. For example, a WTRU receiving (e.g., grant information associated with) a dual grant may determine (e.g., select) one of the two UL grants to use for transmission as a function of being in a power limited situation (e.g., configuration, operation mode) or not.

According to embodiments, a gNB may determine that a WTRU may be in a power limited situation (e.g., configuration, operation mode) based on any of receiving a PHR (e.g., indicating a zero power headroom), receiving any of a reference signal received power (RSRP) and a reference signal received quality (RSRQ) report that may reveal (e.g., indicate) a cell edge WTRU position, and any other signaling or trigger for a power limited situation (e.g., configuration, operation mode).

Examples of UL Dynamic Grant—RB Allocation Versus PRT Location

Examples of Contiguous Allocations

According to embodiments, a DCI including dynamic UL grants (e.g., information) may be received by a WTRU, wherein the DCI may include an indication (e.g., specific, extra bit) indicating the possibility for the WTRU to use any number of fixed and dedicated physical resource blocks (PRBs) for PRT technique, e.g., according to its declared PRT capability. For example, one RB on each of the edges outside of the data related RB allocation from the UL grant, may be used to transmit a PRT signal. According to embodiments, after reception of (e.g., grant information associated with) a dual grant, the WTRU may determine to use it (e.g., transmit a PRT signal) or not based on e.g., a power limited criterion. For example, after reception of the (e.g., grant information associated with) UL grant, the WTRU may compute the power allocation for the grant related to the transport block on the data related RBs. The power allocation calculation may lead to any of a scaling situation (e.g., operation) and a power limited situation (e.g., configuration, operation mode). For example, in a carrier aggregation situation, a different channel in a different carrier belonging to the same UL RF chain may result in a power limited situation (e.g., configuration, operation mode). For example, a WTRU may not have enough power to transmit multiple signals and may reduce the transmit power accordingly (e.g., based on a scaling factor). For example, a WTRU transmitting a first signal (e.g., PUSCH) and a second signal (e.g., PUCCH), may determine a first transmit power (P1) and a second transmit power (P2) for transmitting respectively the first (e.g., PUSCH) and the second (e.g., PUCCH) signals. In case the sum (P1+P2) of the first (P1) and second (P2) transmit powers exceeds the configured maximum output power (Pcmax), the WTRU may reduce the transmit powers for transmitting respectively the first (e.g., PUSCH) and the second (e.g., PUCCH) signals by applying a scaling factor to respectively the first (P1) and the second (P2) transmit powers.

According to embodiments, in a case where the WTRU determines to be in any of a scaling situation (e.g., operation) and a power limited situation (e.g., configuration, operation mode), the WTRU may add the PRT tones (e.g., transmit a PRT signal) in the regions indicated according to its PRT declared capability.

According to embodiments, the WTRU may receive (e.g., UL grant information associated with) a dynamic UL grant including the RB allocation and related modulation and an (e.g., separate) indication (e.g., a DCI bit) that may enable the PRT technique inside the RB allocation. For example, the WTRU may place the PRT tones (e.g., transmit a PRT signal) according to its declared PRT capability in a case where the power UL allocation evaluation leads to any of a scaling situation (e.g., operation) and a power limited situation (e.g., configuration, operation mode). For example, in a carrier aggregation situation, a different channel in a different carrier belonging to the same UL RF chain may result in a power limited situation (e.g., configuration, operation mode).

Examples of Non-Contiguous Allocations and PRT Positions

According to embodiments, a WTRU may receive a non-contiguous allocation (e.g., comprising any number of allocation gaps). For example, due to its allocation related maximum power reduction (MPR), (that may be higher than the MPR for contiguous allocation) the WTRU may use the PRT scheme in any power limited situation (e.g., configuration, operation mode). The WTRU may, for example, place PRT RBs (e.g., also) in an RB allocation gap, e.g., for reducing the global PAPR. For example, a (e.g., detailed) uplink control information (UCI) describing PRT RB placement may be transmitted by the WTRU.

Example of Random PRT Positions

According to embodiments, a WTRU may receive (e.g., UL grant information associated with) the UL grant with an indication that the PRT technique may be enabled. For example, the (e.g., PRT technique) bit may be set for an UL grant. According to embodiments, the WTRU may evaluate the power allocation (e.g., for the UL transmission) and may determine that the WTRU may be in a power limited situation (e.g., configuration, operation mode). If it is determined that the WTRU is in a power limited situation (e.g., configuration, operation mode), the WTRU may use a PRT position determination through a (e.g., randomization) scheme. For example, the WTRU capabilities may include a (e.g., maximum) number of any of PRT RBs and RE resources, and the UL grant may be calculated (e.g., determined) by the gNB scheduler, e.g., based on that (e.g., maximum) number. In another example, there may be no established limit. The gNB may signal (e.g., indicate) in the DCI grant (e.g., along the PRT indication (e.g., bit) a (e.g., maximum) number of PRT resources. According to embodiments, the randomization of the PRT position may follow a (e.g., specific) algorithm that the gNB and the WTRU may share (e.g., may commonly know). The (e.g., specific) algorithm for PRT position randomization may be any of indicated (e.g., declared) in the WTRU capabilities, a standard based randomization scheme/algorithm, where the seed may be known (such as e.g., a WTRU RNTI).

Examples of UL Semi-Persistent Grant (RRC Configured)—RB Allocation Versus PRT Allocation According to embodiments, a WTRU may be configured by RRC with semi-persistent UL grants. For example, a description of the (e.g., alternative) PRT grant techniques may be signaled (e.g., indicated) to the WTRU by RRC.

According to embodiments, a WTRU may be configured with any of configured grants of type 1 and configured grants of type 2. Configured grants of type 1 may be configured based on RRC (re)configuration, e.g., without any layer 1 signaling. For example, a configured grant of type 1 may not rely on the DCI based activation. A WTRU may be configured with (e.g., receive configuration information indicating) any of the (e.g. regular, type 1) grant, the PRT related allowed positions, and (e.g., specific) UCI information that the WTRU may relay (e.g., transmit) to the gNB when using the PRT technique (e.g., transmitting a PRT signal).

Configured grants of type 2 may be have a transmission periodicity, that may be given (e.g., configured, indicated) through RRC. Layer 1/layer 2 signaling may be used for controlling deactivation/activation of the transmission. For example, the transmission parameters may be received by (e.g., indicated to) the WTRU similar to the dynamic grant. For example, the WTRU may (e.g., periodically) transmit, e.g., as long as the buffer data is not empty. Similar to the configured grant type 1, any of the PRT properties (e.g., parameters), PRT positions, PRT algorithm that may be used, and PRT related UCI information may be received by (e.g., signaled to, indicated to) the WTRU via RRC. Transmitting those PRT related information via RRC may allow to keep the dynamic information carried in PDCCH reduced (e.g., to a minimum).

Examples of UL Control Information (PRT Technique Related UCI)

According to embodiments, in case of a dual grant configuration, a WTRU may be configured to use the UCI to indicate (e.g., to the gNB, e.g., by transmitting UCI information indicating) which grant may have been selected.

Examples of PRT Technique Without UL UCI Information

According to embodiments, a WTRU may receive (e.g., UL grant information associated with) an UL grant with a DCI indication that PRT technique may be used with a fix PRT sequence according to a fix table. The WTRU, after receiving such UL grant (e.g., information) may apply it (e.g., transmit a PRT signal in the granted PRT resources). For example, the gNB may cancel the fixed (e.g., PRT) locations without any (e.g., special) UCI information from the WTRU. The table may be a seen as an extension of an MPR table that may be implemented in the gNB scheduler.

According to embodiments, the RB allocation included in the UL grant (e.g., information) may involve (e.g., include) an allocation region that may involve additional maximum power reduction (A-MPR, additional reductions e.g., due to coexistence cases). In a case where the UL grant involves A-MPR, the PRT scheme may not be applicable and the (e.g., normal) Pcmax procedures may take precedence (e.g., may apply).

Examples of PRT Technique With UL UCI Information

According to embodiments, a WTRU may use the PRT technique (e.g., transmit a PRT signal in a PRT resource). According to embodiments, the WTRU may transmit an uplink control information (UCI) to the gNB for the PRT signal demodulation and PRT cancellation. For example, the UCI may be mapped (e.g., included) in the first symbol of the UL slot using the PRT technique (e.g., carrying the PRT signal). For example, the WTRU may multiplex the Ack/NAck in the first symbol along with PRT UCI that may be part of the RB allocation. For example, the PRT related UCI may not puncture any data or Ack/NAck related bits.

According to embodiments, the WTRU allocated UL grant may include the UCI information. Any embodiment for UCI may be used individually or as a combination without limitation.

According to embodiments, a (e.g., simple fixed) PRT scheme may be used. For example, the WTRU may use all the PRT tones (e.g., frequency resources (e.g., RBs) that may have been allocated to a PRT signal transmission). For example, the UCI may be (e.g., as small as) a single bit, indicating the use or not of the PRT technique with the current UL grant (e.g., PRT signal transmission in all the PRT tones). The (e.g., single bit) indication of whether the PRT technique is used or not may be referred to herein as PRT technique indicator.

According to embodiments, the UCI may comprise a PRT technique indicator and an indication of the power offset of the PRT tones.

According to embodiments, the WTRU may use fewer resources than the allocated PRT resources (e.g., allocated to PRT signal transmission). For example, the WTRU may indicate (e.g., include) in the UCI the PRT technique indicator, and the number of the RBs used for PRT technique. For example, full or half PRT resources usage may be signaled using e.g., a single bit. The number of the RBs used for transmitting a PRT signal may be indicated by any number of bits, e.g., from a single bit indicating use of the PRT technique or not, to N bits, N being an integer number greater than one. For example, N bits may (e.g., be used to) point to (e.g., indicate) $2^{N-1}$ possible (e.g., different) PRT configurations and one without PRT.

According to embodiments, the WTRU may indicate to the gNB (e.g., transmit information indicating) the selected PRT configuration. For example, a WTRU may be (pre) configured with (e.g., receive configuration information indicating) a set of PRT configurations, wherein each configuration may be identified by an index (e.g., identifier). The WTRU may indicate the selected PRT configuration, e.g., by transmitting UCI information indicating the PRT index (e.g., identifier) e.g., using a bitfield in the UCI (pointing to (e.g., indicating) one of the PRT configuration). Any technique for transmitting information indicating the selected PRT configuration (e.g., via UCI information) may be applicable to embodiments described herein.

According to embodiments, the WTRU may determine a PRT position through a (e.g., specific, randomization)

scheme. For example, the WTRU may indicate the PRT position determination (e.g., randomization) algorithm. If more than one (e.g., randomization) algorithm is possible, the PRT position determination (e.g., randomization) algorithm may be indicated by e.g., a pointer. In another example, if an algorithm uses a specific sequence as a seed, the seed may be indicated by a pointer. For example, a randomization algorithm may use a WTRU RNTI, for example, as any of a seed and a mask to determine the PRT positions in (e.g., each symbol of) the UL slot transmission.

According to embodiments, the WTRU may include in the UCI an indication (e.g., bitmap) showing the PRT position, e.g., along with PRT technique indicator.

Example of Multiplexing PRT with Uplink Transmission

A WTRU may use a set of N modulated data symbols to generate the PRT symbols. FIG. 5 is a diagram illustrating such an example. For example, a precoder may be used to generate the PRT symbols, where the N modulated data symbols may be the input of the precoder and the PRT symbols may be the output of the precoder, as shown in block 501 of FIG. 5. The WTRU may then map (e.g., associate) the generated PRT symbols to a set of REs using the (e.g., configured) REs for the UL data transmission and the PRT transmission, as shown in block 503 of FIG. 5. The N modulated data symbols may be fed directly (e.g., before precoding in block 501) to block 505, where the WTRU may use the remaining REs from the available REs for the UL data transmission and the PRT transmission to map (e.g., associate) the N modulated data symbols to the set of REs. For example, the WTRU may transmit both the REs with PRT symbols and the REs for UL data as shown in FIG. 5. The PRT precoder 501 may be characterized by (e.g., associated with) the ratio R=M/N, where M and N may be the generated PRT symbols and data symbols, respectively.

According to embodiments, a WTRU may (e.g., be configured to) use any of rate matching and puncturing to generate the number of symbols, N, and may map (e.g., associate) the N symbols to a set of REs based on the value of any of the ratio R value and the M value. For example, for values of any of R and M that may be above a threshold, the WTRU may use rate matching, and for values of any of R and M below the threshold, the WTRU may use puncturing.

According to embodiments, a WTRU may determine that few REs may be needed (e.g., transmitted) for a PRT configuration. For example, in a case where the WTRU determines that the number of REs (e.g., required) for a PRT configuration is below a (e.g., configured) threshold, the WTRU may use puncturing when mapping (e.g., associating) the modulated data symbols. The location of the REs where PRT may be transmitted may be pre-configured. For example, the WTRU may be configured (e.g., receive configuration information indicating) to use the edge RB of an UL grant.

According to embodiments, a WTRU may (e.g., be configured to, transmit information to) indicate to the gNB whether puncturing or rate matching may be used by the WTRU to transmit PRT. In one example, a WTRU may use the UCI piggybacked in the PUSCH transmission to indicate whether rate matching or puncturing may be used by the WTRU to transmit PRT. For example, the UCI location in the set of REs configured for the UL grant may be shifted in any of the frequency and the time domain due to PRT transmission. For example, the shifting parameters may depend on the number of any of the REs and RBs configured for PRT. For example, the gNB may blindly detect the WTRU transmission to determine the UCI location.

According to embodiments, a WTRU may transmit any of a PRT configuration request and assisting information (e.g., for determining a PRT configuration) on a condition that the WTRU receives a group common signaling enabling PRT feature and on a condition that the WTRU determines to be in a power limited situation (e.g., configuration, operation mode).

According to embodiments, a WTRU may obtain (e.g., select) a PRT configuration (e.g., to be requested to the gNB), as a function of the available power headroom, the modulation and the number of RBs to be used for an uplink transmission.

According to embodiments, a WTRU may transmit (e.g., report) a list of PRT configurations, that the WTRU may be capable to support, for a list of (e.g., supported) modulation and frequency resource allocations.

According to embodiments, a WTRU may receive (e.g., UL grant information associated with) two UL grants, e.g., one comprising PRT tones and one without PRT tones. A PRT tone may be seen as a frequency resource to be used by the WTRU for transmitting a PRT signal. According to embodiments, the WTRU may select one of the two grants to use for an UL transmission as a function of being in a power limited situation (e.g., configuration, operation mode) or not.

According to embodiments, a WTRU may indicate (e.g., to the gNB) the UL grant used for the UL transmission, after the WTRU may have selected one of the two UL grants.

FIG. 4 is a diagram illustrating an example of a method 400 for enabling a tone reservation.

According to embodiments, in a step 410, a WTRU may transmit an information for requesting a PRT configuration e.g., for reducing a PAPR.

According to embodiments, in a step 420, the WTRU may receive an indication of (e.g., PRT) frequency resources to be used for transmitting a PRT signal based on the (e.g., requested) PRT configuration.

According to embodiments, in a step 430, the WTRU may transmit the PRT signal in the (e.g., PRT) frequency resources in addition to an UL transmission. For example, the UL transmission may be performed to transmit any kind of data (e.g., user data, control data, . . . ). For example, the PRT frequency resources may be (e.g., allocated) based on (e.g., a set) of frequency resources that may have been allocated for the UL transmission. For example, the (e.g., PRT) frequency resources may be located at an (e.g., each) edge of a block of (e.g., contiguous) frequency resources that may have been allocated for the UL transmission. Any kind of PRT frequency resource allocation based on (e.g., collocated with) other frequency resources allocated to an UL transmission for reducing the PAPR of a transmission may be applicable to embodiments described herein.

For example, the (e.g., requested) PRT configuration may belong to a set of PRT configurations, that may have been preliminarily configured in the WTRU.

For example, the information for requesting the PRT configuration may comprise an indication (e.g., any of an index, an identifier) of the requested PRT configuration.

For example, the WTRU may transmit an SRS along with the information for requesting a PRT configuration.

For example, the (e.g., transmitted) SRS may indicate the requested PRT configuration.

For example, the SRS may be transmitted in an SRS resource that may indicate (e.g., allow to identify) the requested PRT configuration.

For example, the requested PRT configuration may be determined by the WTRU based on any of an amount of resources for the UL transmission, an available power headroom, a level of transmit power in a previous UL transmission, a WTRU capability, a power class, a measurement of reference signals, a received transmit power control command, a type of the UL transmission, an operating band, a target block error rate for the UL transmission.

For example, the information may comprise an assisting information for assisting a network element to select the PRT configuration.

For example, the assisting information may comprise a power offset between powers used for respectively transmitting the PRT signal and the UL transmission.

For example, the indication of frequency resources to be used for transmitting the PRT signal may be received in any of a DCI and a RRC configuration message.

For example, the PRT signal may be based on the UL transmission for minimizing the PAPR of a sum of the PRT signal and the UL transmission.

For example, the PRT signal may be obtained (e.g., generated) to minimize a cubic metric of a sum of the PRT signal and the UL transmission.

For example, the WTRU may transmit a PHR that may include a first PH value computed using a first (e.g., normal) PCmax value and a second PH value computed using a second PCmax value that may correspond to the configuration of the transmitted PRT signal.

For example, the WTRU may transmit a difference between the first PCmax value and the second PCmax value.

For example, the WTRU may transmit a difference between the first PH value and the second PH value.

For example, transmitting the PRT signal may comprise (1) generating a number, M, of PRT symbols from a number, N, of data symbols, (2) mapping the M PRT symbols to a first set of resource elements (REs), (3) mapping the N data symbols to a second set of REs, wherein, if a ratio, R, wherein R=M/N, is above a threshold, the WTRU may use rate matching to generate the N data symbols and map the N data symbols to REs and, if R is below the threshold, the WTRU may use puncturing to generate the N data symbols and map the N data symbols to REs.

For example, the WTRU may transmit an indication of whether rate matching or puncturing was used to transmit the PRT.

FIG. 6 is a diagram illustrating an example of a method 600 for enabling a tone reservation. For example, the method may be implemented in a WTRU.

According to embodiments, in a step 610, tone reservation (TR) configuration information may be received, where the TR configuration information may indicate a set of TR configurations. For example, the TR configuration information may comprise a set of TR configuration information elements, where a (e.g., each) TR configuration information element may be associated with a TR configuration in the set of TR configurations. For example, a (e.g., each) TR configuration information element may include information (e.g., parameter(s) as described in any embodiment described herein) indicating the associated TR configuration.

According to embodiments, in a step 620, a power headroom (PH) may be determined for a first uplink grant.

According to embodiments, in a step 630, a first TR configuration may be selected from the indicated set of TR configurations. For example, the first TR configuration may be selected based on any of the first uplink grant and the determined PH. In another example, the first TR configuration may be selected based on e.g., any of downlink RS measurement(s), a number N of (e.g., consecutive) received TPC commands, and a target BLER of an uplink transmission. Any other example of criteria for selecting (e.g., requesting) the first TR configuration may be applicable to embodiments described herein.

According to embodiments, in a step 640, first information indicating the selected first TR configuration may be transmitted. According to embodiments, in a step 650, second information indicating a second TR configuration of the indicated set of TR configurations, may be received.

According to embodiments, in a step 660, a second uplink grant may be received.

According to embodiments, in a step 670, the WTRU may transmit information comprising (1) a data transmission according to the second uplink grant at a first power level and (2) a TR transmission, wherein the TR transmission may be transmitted in frequency resources determined according to the second TR configuration, and wherein the TR transmission may be transmitted at a second power level determined based on the first power level and on a power offset associated with the second TR configuration.

For example, the method 600 may further comprise receiving first uplink grant information associated with the first uplink grant, the first uplink grant information indicating any of (1) a resource block (RB) allocation and (2) a modulation and coding scheme (MCS), wherein the selection of the first TR configuration may be in accordance with any of the RB allocation and the MCS.

For example, the first TR configuration may be selected on condition that any of (1) a path loss is less than a first threshold, (2) a transmit power is at a maximum power level over a configured period of time, and (3) the PH is less than a second threshold.

For example, the TR configuration information indicating the second TR configuration (e.g., the TR configuration information element associated with the second TR configuration) may indicate any of (1) a number of RBs reserved for the TR transmission, (2) the power offset between the first power level to be used for the data transmission and the second power level to be used for the TR transmission, (3) a location of the reserved RBs associated with any of a bandwidth part (BWP) and a carrier component (CC), (4) any of at least one subframe and at least one slot where the second TR configuration may apply, (5) any of a periodicity and an offset where the second TR configuration may apply (6) a subcarrier spacing, (7) any of a BWP index and a CC index, (8) a method to generate the TR transmission, (9) a density indication indicating whether the TR transmission is contiguous or noncontiguous with the data transmission, (10) a transmit power control step size, and (11) a precoder ratio.

For example, the TR configuration information may be received in any of downlink control information (DCI) and a radio resource control (RRC) message.

For example, the selecting of the first TR configuration may be in accordance with any of a transmit power level of a previous data transmission, a WTRU capability, a power class, a measurement of reference signals, a received transmit power control command, a type of the data transmission, an operating band, a target block error rate for the data transmission, and a frequency allocation of the first uplink grant.

For example, the transmitting of the first information indicating the selected first TR configuration may comprise transmitting a sounding reference signal (SRS).

For example, the method 600 may further comprise receiving SRS configuration information indicating that the first TR configuration may be associated with any of the SRS and at least one SRS resource. For example, the SRS configuration information may be received any of as part of (e.g., included in) the TR configuration information and separated (e.g., independently) from the TR configuration information.

For example, the transmitted SRS associated with the first TR configuration may indicate that the first TR configuration may have been selected.

For example, the transmitted SRS may indicate that the first TR configuration may have been selected, on condition that the SRS is transmitted in the at least one SRS resource associated with the first TR configuration.

For example, the first information indicating the selected first TR configuration may be transmitted in any of a MAC CE, UCI and an RRC message.

For example, the method 600 may further comprise multiplexing the first information indicating the selected first TR configuration with UCI on a PUCCH, wherein the UCI may comprise any of SR information, HARQ-ACK feedback information and CSI.

For example, the method 600 may further comprise multiplexing the first information indicating the selected first TR configuration with UCI on a PUSCH.

For example, the first information indicating the selected first TR configuration may be transmitted based on any of the first uplink grant and a further uplink grant.

For example, the method 600 may further comprise transmitting a power headroom report (PHR) comprising power information associated with a transition from a current TR configuration to the selected first TR configuration.

For example, the power information may indicate any of (1) a first PH value computed using a first configured maximum output power (PCmax) value corresponding to the current TR configuration, (2) a second PH value computed using a second PCmax value corresponding to the selected first TR configuration, (3) a first difference value computed using a difference between the first PCmax value and the second PCmax value, and (4) a second difference value computed using a difference between the first PH value and the second PH value.

For example, transmitting the TR transmission may comprise generating a first number, M, of TR symbols from a second number, N, of data symbols, the M TR symbols associated with a first set of resource elements (REs) and the N data symbols associated with a second set of REs, wherein the generating of the N data symbols may include any of rate matching and puncturing the N data symbols based on any of (1) a ratio, R, of M to N, and (2) M.

For example, the method 600 may further comprise transmitting an indication of whether rate matching or puncturing may have been used to transmit the TR transmission.

For example, the TR transmission may be performed in such a way as to minimize any of (1) a cubic metric of a sum of the TR transmission and the data transmission, and (2) a peak to average power ratio (PAPR) of the sum of the TR transmission and the data transmission.

According to embodiments, a WTRU may receive TR configuration information indicating a set of TR configurations. For example, the TR configuration information may comprise SRS association information indicating that at least one TR configuration may be associated with any of at least one SRS and at least one SRS resource. For example, the WTRU may select a first TR configuration according to any embodiment described herein and may transmit an indication of the selected first TR configuration by any of transmitting the at least one SRS associated with the first TR configuration and transmitting (e.g., a transmission) in the at least one SRS resource associated with the first TR configuration.

According to embodiments, a WTRU may receive TR configuration information indicating a set of TR configurations. For example, a TR configuration may be selected from the indicated set of TR configurations. For example, the WTRU may transmit information comprising (1) a data transmission according to an uplink grant at a first power level and (2) a TR transmission, wherein the TR transmission may be transmitted in frequency resources determined according to the selected TR configuration, and wherein the TR transmission may be transmitted at a second power level determined based on the first power level and on a power offset associated with the selected TR configuration.

In a first example, a first TR configuration may be selected by the WTRU from the indicated set of TR configurations based on any criteria described herein. First information indicating the first TR configuration may be transmitted (e.g., to the gNB). Second information indicating a second TR configuration may be received (e.g., from the gNB). The second TR configuration may correspond to the selected TR configuration (e.g., to be used for performing TR transmission).

In a second example, capability information may be transmitted by the WTRU (e.g., to the gNB). The capability information may indicate a capability of the WTRU to (e.g., autonomously) enable TR operation. For example, first uplink grant information associated with the first uplink grant may be received. The first uplink grant information may indicate that the WTRU may enable TR operation (e.g., perform TR transmission as described herein). For example, the WTRU may transmit UCI indicating any of the (e.g., autonomously) selected TR configuration and the frequency resources for TR transmission.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

While not explicitly described, the present embodiments may be employed in any combination or sub-combination. For example, the present principles are not limited to the described variants, and any arrangement of variants and embodiments can be used.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method implemented by a wireless transmit/receive unit (WTRU), the method comprising:

determining that a power condition is satisfied;

selecting a requested tone reservation (TR) configuration from a set of TR configurations based on the power condition being satisfied;

transmitting first information indicating the requested TR configuration;

receiving second information indicating the requested TR configuration or a different TR configuration of the set of TR configurations; and performing a transmission according to the requested TR configuration or the different TR configuration indicated in the received second information, wherein the performing of the transmission includes:

selecting a first set of resources for data transmission and a second set of resources adjacent to the first set of resources for a first tone reservation; and selecting a first transmit power for the first set of resources that is greater than a second transmit power for the second set of resources such that the data transmission is transmitted on the first set of resources at a power higher than a maximum power level.

2. The method of claim 1, further comprising receiving uplink grant information indicating any of (1) a resource block (RB) allocation and (2) a modulation and coding scheme (MCS), wherein the requested TR configuration is selected in accordance with any of the RB allocation and the MCS.

3. The method of claim 1, wherein the first information indicating the requested TR configuration is transmitted in any of a medium access control (MAC) control element, uplink control information (UCI) and a radio resource control (RRC) message.

4. The method of claim 1, further comprising multiplexing the first information indicating the requested TR configuration with UCI on a physical uplink control channel (PUCCH), wherein the UCI comprises any of scheduling request (SR) information, hybrid automatic repeat request acknowledge (HARQ-ACK) feedback information and channel state information (CSI).

5. The method of claim 1, further comprising multiplexing the first information indicating the requested TR configuration with UCI on a physical uplink shared channel (PUSCH).

6. The method of claim 1, further comprising determining the second set of resources according to the requested TR configuration or the different TR configuration indicated in the received second information.

7. The method of claim 1, further comprising determining the second transmit power based on the first transmit power and on a power offset associated with the requested TR configuration or the different TR configuration indicated in the received second information.

8. The method of claim 7, wherein the second information indicates any of (1) a number of RBs reserved for TR, (2) the power offset between the first transmit power and the second transmit power, (3) a location of the reserved RBs associated with any of a bandwidth part (BWP) and a carrier component (CC), (4) any of at least one subframe and at least one slot where the requested TR configuration or the different TR configuration applies, (5) any of a periodicity and an offset when the requested TR configuration or the different TR configuration applies, (6) a subcarrier spacing, (7) any of a BWP index and a CC index, (8) a method to generate the TR, (9) a density indication indicating whether the TR is contiguous or noncontiguous with the data, (10) a transmit power control step size, and (11) a precoder ratio.

9. The method of claim 1, further comprising receiving TR configuration information indicating the set of TR configurations.

10. The method of claim 1, wherein the power condition is satisfied in a case when a power headroom is less than a threshold, and wherein the requested TR configuration is selected in accordance with the power headroom.

11. The method of claim 1, wherein the power condition is satisfied in a case when a reference signal received power is less than a threshold.

12. The method of claim 1, wherein the power condition is satisfied in a case when a maximum power has been used for transmitting over a period of time, and wherein the requested TR configuration is selected in accordance with the maximum power used over the period of time.

13. A wireless transmit/receive unit (WTRU) comprising circuitry, including any of a transmitter, a receiver, a processor and a memory, the WTRU being configured to:

determine that a power condition is satisfied;

select a requested tone reservation (TR) configuration from a set of TR configurations based on the power condition being satisfied;

transmit first information indicating the requested TR configuration;

receive second information indicating the requested TR configuration or a different TR configuration of the set of TR configurations; and perform a transmission according to the requested TR configuration or the different TR configuration indicated in the received second information, wherein being configured to perform the transmission comprises being configured to:

select a first set of resources for data transmission and a second set of resources adjacent to the first set of resources for a first tone reservation; and select a first transmit power for the first set of resources that is greater than a second transmit power for the second set of resources such that the data transmission is transmitted on the first set of resources at a power higher than a maximum power level.

14. The WTRU of claim 13, wherein the WTRU is further configured to determine the second set of resources according to the requested TR configuration or the different TR configuration indicated in the received second information.

15. The WTRU of claim 13, wherein the WTRU is further configured to determine the second transmit power based on the first transmit power and on a power offset associated with the requested TR configuration or the different TR configuration indicated in the received second information.

16. The WTRU of claim 13, wherein the WTRU is further configured to receive TR configuration information indicating the set of TR configurations.

17. The WTRU of claim 13, wherein the power condition is satisfied in a case when a power headroom is less than a threshold, and wherein the requested TR configuration is selected in accordance with the power headroom.

18. The WTRU of claim 13, wherein the power condition is satisfied in a case when a reference signal received power is less than a threshold.

* * * * *